United States Patent
Huizing et al.

(10) Patent No.: US 10,866,001 B2
(45) Date of Patent: *Dec. 15, 2020

(54) BLENDED MEMBRANES FOR WATER VAPOR TRANSPORT AND METHODS FOR PREPARING SAME

(71) Applicant: CORE Energy Recovery Solutions Inc., Vancouver (CA)

(72) Inventors: Ryan Nicholas Huizing, Vancouver (CA); Hao Chen, Burnaby (CA); Frankie Kin Bong Wong, Vancouver (CA)

(73) Assignee: CORE Energy Recovery Solutions Inc., Vancouver (CA)

( * ) Notice: Subject to any disclaimer, the term of this patent is extended or adjusted under 35 U.S.C. 154(b) by 133 days.

This patent is subject to a terminal disclaimer.

(21) Appl. No.: 16/163,312

(22) Filed: Oct. 17, 2018

(65) Prior Publication Data

US 2019/0093907 A1 Mar. 28, 2019

Related U.S. Application Data

(63) Continuation of application No. 15/319,483, filed as application No. PCT/CA2015/050557 on Jun. 16, 2015, now Pat. No. 10,139,116.

(Continued)

(51) Int. Cl.
*F24F 3/147* (2006.01)
*C09D 171/00* (2006.01)
(Continued)

(52) U.S. Cl.
CPC ............ *F24F 3/147* (2013.01); *B01D 53/228* (2013.01); *B01D 53/268* (2013.01); *B01D 69/02* (2013.01);
(Continued)

(58) Field of Classification Search
CPC .... B01D 53/228; B01D 53/268; B01D 69/10; B01D 71/06; B01D 71/16; B01D 71/52;
(Continued)

(56) References Cited

U.S. PATENT DOCUMENTS 3,852,947 A * 12/1974 Mayer ...................... D01F 1/07
57/245
4,824,443 A 4/1989 Matson et al.
(Continued)

FOREIGN PATENT DOCUMENTS

CA 2761826 A1 11/2010
CA 2849290 A1 3/2013
(Continued)

OTHER PUBLICATIONS

Zhang, S.S., "A review on the separators of liquid electrolyte Li-ion batteries", Journal of Power Sources, vol. 164, No. 1, pp. 351-364, Jan. 2007.
(Continued)

*Primary Examiner* — Jason M Greene
(74) *Attorney, Agent, or Firm* — Oyen Wiggs Green & Mutala LLP

(57) ABSTRACT

Water vapor transport membranes for ERV and other water vapor transport applications are provided. The membranes include a substrate and an air impermeable selective layer coated on the substrate, the selective layer including a cellulose derivative and a sulfonated polyaryletherketone. In some embodiments the sulfonated polyaryletherketone is in a cation form and/or the selective layer includes sPEEK and CA in an sPEEK:CA (wt.:wt.) ratio in the range of about 7:3 to 2:3. Methods for making such membranes are provided. The methods include applying a coating solution/dispersion to a substrate and allowing the coating solution/dispersion to dry to form an air impermeable selective layer on the
(Continued)

substrate, the coating solution/dispersion including a cellulose derivative and a sulfonated polyarylether ketone. In some embodiments the sulfonated polyaryletherketone is in a cation form and/or the coating solution/dispersion includes sPEEK and CA in an sPEEK:CA (wt.:wt.) ratio in the range of about 7:3 to 2:3.

18 Claims, 10 Drawing Sheets

Related U.S. Application Data

(60) Provisional application No. 62/012,533, filed on Jun. 16, 2014.

(51) Int. Cl.
| | |
|---|---|
| C08G 65/48 | (2006.01) |
| C09D 101/12 | (2006.01) |
| C09D 101/14 | (2006.01) |
| C09D 101/28 | (2006.01) |
| B01D 69/02 | (2006.01) |
| B01D 69/10 | (2006.01) |
| B01D 69/12 | (2006.01) |
| B01D 71/16 | (2006.01) |
| B01D 71/52 | (2006.01) |
| B01D 71/82 | (2006.01) |
| B01D 53/22 | (2006.01) |
| B01D 53/26 | (2006.01) |
| D06M 15/07 | (2006.01) |
| D06M 15/53 | (2006.01) |
| D06N 3/00 | (2006.01) |
| D06N 3/02 | (2006.01) |
| D06N 3/12 | (2006.01) |
| C08J 7/04 | (2020.01) |
| B01D 61/36 | (2006.01) |
| F24F 3/14 | (2006.01) |

(52) U.S. Cl.
CPC ............ *B01D 69/10* (2013.01); *B01D 69/12* (2013.01); *B01D 71/16* (2013.01); *B01D 71/52* (2013.01); *B01D 71/82* (2013.01); *C08G 65/48* (2013.01); *C08J 7/0427* (2020.01); *C09D 101/12* (2013.01); *C09D 101/14* (2013.01); *C09D 101/28* (2013.01); *C09D 171/00* (2013.01); *D06M 15/07* (2013.01); *D06M 15/53* (2013.01); *D06N 3/0004* (2013.01); *D06N 3/02* (2013.01); *D06N 3/12* (2013.01); *B01D 61/362* (2013.01); *B01D 2053/222* (2013.01); *B01D 2257/80* (2013.01); *B01D 2258/06* (2013.01); *B01D 2323/39* (2013.01); *B01D 2325/02* (2013.01); *B01D 2325/16* (2013.01); *B01D 2325/20* (2013.01); *C08G 2340/00* (2013.01); *C08G 2650/02* (2013.01); *C08G 2650/40* (2013.01); *C08J 2301/12* (2013.01); *C08J 2323/00* (2013.01); *C08J 2371/10* (2013.01); *C08J 2400/10* (2013.01); *C08J 2401/00* (2013.01); *C08J 2401/12* (2013.01); *C08J 2471/08* (2013.01); *C08J 2471/10* (2013.01); *F24F 2003/1435* (2013.01)

(58) Field of Classification Search
CPC ............... B01D 71/82; B01D 2257/80; B01D 2325/02; B01D 2325/16; B01D 2325/20; F24F 3/147; F24F 2003/1435; C08G 65/48; C08J 7/047; C09D 101/12; C09D 171/00
See application file for complete search history.

(56) References Cited

U.S. PATENT DOCUMENTS

| | | |
|---|---|---|
| 5,356,459 A | 10/1994 | Bikson et al. |
| 5,510,424 A | 4/1996 | Helmer-Metzmann et al. |
| 6,224,763 B1 * | 5/2001 | Feng ............... B01D 61/00 210/232 |
| 6,914,084 B1 | 7/2005 | Soczka-Guth et al. |
| 7,052,805 B2 | 5/2006 | Narang et al. |
| 7,883,767 B2 | 2/2011 | Childs et al. |
| 8,486,579 B2 | 7/2013 | Huang et al. |
| 8,936,668 B2 | 1/2015 | Huizing et al. |
| 10,139,116 B2 * | 11/2018 | Huizing ............... B01D 53/268 |
| 2003/0187081 A1 | 10/2003 | Cui |
| 2004/0259446 A1 | 12/2004 | Jain et al. |
| 2005/0014432 A1 | 1/2005 | Jain et al. |
| 2007/0163951 A1 | 7/2007 | McGrath et al. |
| 2009/0149565 A1 | 6/2009 | Liu et al. |
| 2009/0176052 A1 | 7/2009 | Childs et al. |
| 2010/0108599 A1 | 5/2010 | Vizvardi et al. |
| 2011/0136016 A1 | 6/2011 | Huang et al. |
| 2011/0223486 A1 | 9/2011 | Zhang et al. |
| 2012/0061045 A1 | 3/2012 | Huizing |
| 2013/0233788 A1 | 9/2013 | Vizvardi et al. |
| 2014/0157985 A1 | 6/2014 | Scovazzo et al. |
| 2014/0251897 A1 | 9/2014 | Livingston et al. |

FOREIGN PATENT DOCUMENTS

| | | | |
|---|---|---|---|
| CN | 1439032 A | 8/2003 | |
| CN | 1834135 A | 9/2006 | |
| CN | 101264427 A | 9/2008 | |
| CN | 100455433 C | 1/2009 | |
| CN | 102337019 B | 4/2013 | |
| EP | 0286091 A2 | 10/1988 | |
| EP | 0337626 | * 10/1989 | ............ B01D 13/04 |
| EP | 0337626 A1 | 10/1989 | |
| EP | 0460769 A1 | 12/1991 | |
| EP | 0732143 B1 | 11/1997 | |
| WO | 0000268 A1 | 1/2000 | |
| WO | 2005120701 A1 | 12/2005 | |
| WO | 2008076602 A1 | 6/2008 | |
| WO | 2009075947 A1 | 6/2009 | |
| WO | 2010002502 A2 | 1/2010 | |
| WO | 2013057492 A1 | 4/2013 | |
| WO | 2013091099 A1 | 6/2013 | |
| WO | 2013133926 A1 | 9/2013 | |

OTHER PUBLICATIONS

Arora, P. et al., "Battery Separators", Chem. Rev., vol. 104, No. 10, pp. 4419-4462, Oct. 2004.
Shibuya, N. et al., "Kinetics of PEEK sulfonation in concentrated sulfuric acid", Macromolecules, vol. 25, No. 24, pp. 6495-6499, Nov. 1992.
Othman, M. H. D. et al., "Physico-Chemical Study of Sulphonated Poly(Ether Ether Ketone) Membranes for Direct Methanol Fuel Cell Application", Malaysian Polymer Journal, 2007, 2, 10 28.
Gibson, P. et al., "An Automated Water Vapor Diffusion Test Method for Fabrics, Laminates, and Films", Journal of Industrial Textiles, vol. 24, No. 4, pp. 322-345, Apr. 1995.
Arthanareeswaran, G. et al., "Transport of copper, nickel and zinc ions across ultrafiltration membrane based on modified polysulfone and cellulose acetate", Asia-Pacific Journal of Chemical Engineering (2012), 7(1), 131-139.
Deivanayagam, P. et al., "Sulfonated Poly(ether ether ketone) and Poly(ethylene glycol) Diacrylate Based Semi-Interpenetrating Network Membranes for Fuel Cells", Journal of Macromolecular Science, Part A: Pure and Applied Chemistry (2012), 49(3), 191-200.

(56) References Cited

OTHER PUBLICATIONS

Arthanareeswaran, G. et al., "Fabrication and Characterization of CA/PSf/SPEEK Ternary Blend Ultrafiltration Membranes", Industrial & Engineering Chemistry Research (2008), 47(5), 1488-1494.

Arthanareeswaran, G. et al., "Removal of chromium from aqueous solution using cellulose acetate and sulfonated poly(ether ether ketone) blend ultrafiltration membranes", Journal of Hazardous Materials (2007), 139(1), 44-49.

Arthanareeswaran, G. et al., "Studies on cellulose acetate and sulfonated poly(ether ether ketone) blend ultrafiltration membranes", European Polymer Journal (2004), 40(4), 751-762.

Sivakumar, M. et al., "Ultrafiltration application of cellulose acetate-polyurethane blend membranes", European Polymer Journal, vol. 35, No. 9, pp. 1647-1651, Sep. 1999.

Sajitha, C.J. et al., "Studies on cellulose acetate-carboxylated polysulfone blend ultrafiltration membranes—Part I", European Polymer Journal, vol. 38, No. 12, pp. 2507-2511, Dec. 2002.

Sivakumar, M. et al., "Preparation and performance of cellulose acetate-polyurethane blend membranes and their applications—II", Journal of Membrane Science, vol. 169, No. 2, pp. 215-228, May 2000.

Kamal, H. et al., "Characterization and some properties of cellulose acetate-co-polyethylene oxide blends prepared by the use of gamma irradiation", Journal of Radiation Research and Applied Sciences, vol. 7, Issue 2, Apr. 2014, pp. 146-153.

Yoon, K. et al., "High flux nanofiltration membranes based on interfacially polymerized polyamide barrier layer on polyacrylonitrile nanofibrous scaffolds", Journal of Membrane Science, 2009, 326, 284-492.

Sijbesma, H. et al., "Flue gas dehydration using polymer membranes", Journal of Membrane Science, 2008, 313, 263-276.

Shao, P. et al., "Polymeric membrane pervaporation", Journal of Membrane Science, vol. 287, Issue 2, Jan. 15, 2007, pp. 162-179.

\* cited by examiner

BLENDED MEMBRANES FOR WATER VAPOR TRANSPORT AND METHODS FOR PREPARING SAME

CROSS-REFERENCE TO RELATED APPLICATIONS

This application is a continuation of U.S. application Ser. No. 15/319,483 filed 16 Dec. 2016 entitled BLENDED MEMBRANES FOR WATER VAPOR TRANSPORT AND METHODS FOR PREPARING SAME, which is a 371 of PCT International Application No. PCT/CA2015/050557 filed 16 Jun. 2015 entitled BLENDED MEMBRANES FOR WATER VAPOR TRANSPORT AND METHODS FOR PREPARING SAME, which claims the benefit of U.S. Provisional Patent Application Ser. No. 62/012,533 to Huizing et al., entitled SULFONATED POLYETHER ETHER KETONE COMPOSITE MEMBRANES FOR ENTHALPY EXCHANGE AND OTHER WATER VAPOR TRANSPORT APPLICATIONS, filed Jun. 16, 2014, assigned to the assignee of the present invention, and incorporated herein by this reference in its entirety.

FIELD

This application relates to membranes that are selectively permeable. A particular application for membranes according to some embodiments is for water vapor transport. Membranes that selectively pass water vapor have application, for example, in energy recovery ventilation ('ERV') systems.

BACKGROUND

In buildings it is generally desirable to provide an exchange of air such that air from inside the building is expelled and replaced with fresh air from outside the building. In colder climates where the inside of the building is much warmer than the outside air ('heating applications') or in hot climates where the inside of the building is air-conditioned and is much cooler than the outside air ('cooling applications') there is an energy cost to this. In heating applications the fresh air is typically both colder and drier than the air inside the building. Energy is required to heat and humidify the fresh air. In cooling applications the fresh air is typically both warmer and more moist than the air inside the building. Energy is required to cool and dehumidify the fresh air. The amount of energy required for heating and cooling applications can be reduced by transferring heat and moisture between the outgoing air and the incoming air. This may be done using an ERV system comprising membranes which separate flows of incoming and outgoing air. The characteristics of the membranes are an important factor in the performance of an ERV system.

Ideally a membrane in an ERV system should be: air-impermeable such that the membrane can maintain effective separation of the incoming and outgoing air flows; have a high thermal conductivity for effective heat transfer between the incoming and outgoing air flows; and provide high water vapor transport for effective transfer of moisture between the incoming and outgoing air flows but substantially block the passage of other gases. Achieving these characteristics typically favors the use of thin membranes.

In addition to the above it is desirable that the membranes be robust enough for commercial use, cost effective to produce, and compliant with any applicable regulations. At least some jurisdictions have regulations that relate to the flammability of membranes used in ERV systems. For example, UL 94 is a standard released by Underwriters Laboratories of the USA which relates to flammability of plastic materials for parts in devices and appliances. UL 94 provides additional classifications VTM-0, VTM-1, VTM-2 for thin films. UL 723 is another standard released by Underwriters Laboratories that provides a test for surface burning characteristics of building materials.

There is a need for membranes suitable for ERV applications and/or other water vapor transport applications that address some or all of these issues.

SUMMARY

This invention has a number of aspects. One aspect provides a membrane having improved water vapor permeability and improved selectivity for water vapor transport. Such membranes may be incorporated into ERV cores and ERV systems. Another aspect provides ERV cores and ERV systems that incorporate such membranes.

In some embodiments, water vapor transport membranes are provided. The membranes include a substrate and an air impermeable selective layer coated on a first surface of the substrate, the selective layer including at least one cellulose derivative and at least one sulfonated polyaryletherketone. In some embodiments the sulfonated polyaryletherketone is in a cation form.

In some embodiments, the cellulose derivative is cellulose acetate (CA) and the sulfonated polyaryletherketone is sulfonated polyether ether ketone (sPEEK) and the selective layer includes sPEEK and CA in an sPEEK:CA (wt.:wt.) ratio in the range of about 7:3 to about 2:3.

Another aspect of the invention provides methods for making water vapor transport membranes for ERV applications or for other applications in which water vapor transport is required.

In some embodiments, the methods include applying a coating solution or dispersion to a first surface of a substrate and allowing the coating solution to dry to form an air impermeable selective layer on the first surface of the substrate, the coating solution including at least one cellulose derivative and at least one sulfonated polyaryletherketone. In some embodiments the sulfonated polyaryletherketone is in a cation form.

In some embodiments, the cellulose derivative is CA and the sulfonated polyaryletherketone is sPEEK and the coating solution or dispersion includes sPEEK and CA in an sPEEK:CA (wt.:wt.) ratio in the range of about 7:3 to about 2:3.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION

Figure 1A:
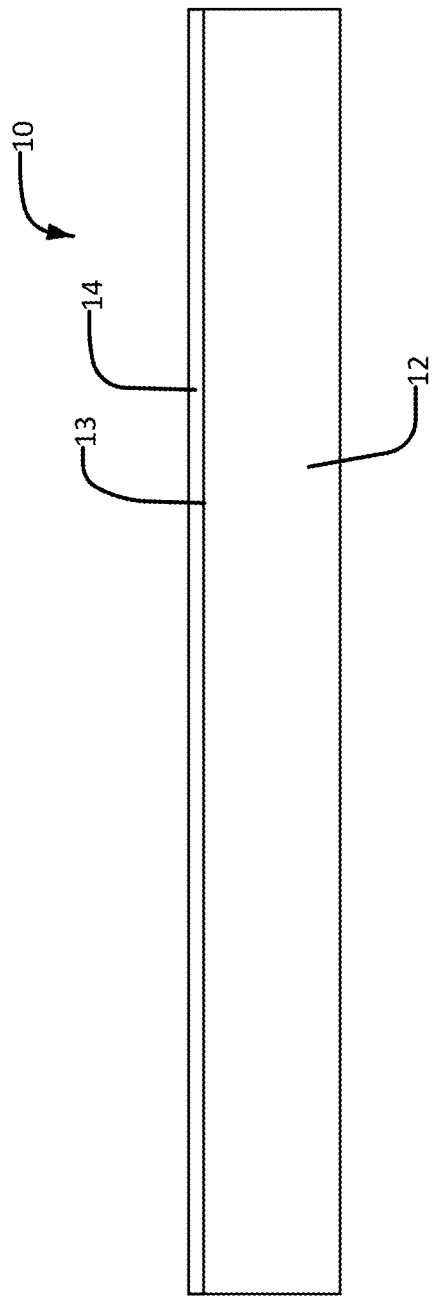
FIG. 1A is a schematic illustration showing a membrane according to an example embodiment.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

List of Definitions

AA crossover—acetic acid permeation.

About—means near the stated value (i.e. within +/−20% of the stated value).

Acetyl content—the percentage by weight (%) of acetyl groups in cellulose acetate.

Blend—a mixture of a substance with one or more other substances, wherein the substance and the one or more other substances combine without chemically reacting with one another.

CA—cellulose acetate. Cellulose acetate is the acetate ester of cellulose. Cellulose acetate is typically derived from naturally originating cellulose materials. Cellulose acetate may be made by acetylating cellulose materials with acetic acid and acetic anhydride in the presence of sulfuric acid. The degree of acetylation typically ranges from about 20 to about 60% (% acetyl content).

CAB—cellulose acetate butyrate.

CAP—cellulose acetate propionate.

Coating loading or coating weight—the basis weight of a selective polymer film layer coated on a substrate in g/m$^2$. When the coating is applied as a continuous dense film on a substrate surface, the coating weight is directly proportional to the thickness of the coating.

DMF—dimethylformamide.

DMSO—dimethyl sulfoxide.

DP—dry-process.

DS—degree of sulfonation. Degree of sulfonation (DS) refers to the ratio of PEEK monomer units in the polymer that contain a sulfonic acid (SO$_3$H) groups to the total number of PEEK monomer units in the polymer. DS=y/(x+y), where x is the total number of PEEK monomer units in the polymer that are not sulfonated and y is the total number of PEEK monomer units in the polymer that are sulfonated. 100% DS means that every PEEK monomer unit in the polymer has a sulfonic acid group.

DP-PP—a porous polypropylene substrate made by a dry stretching process.

EATR—exhaust air transport ratio.

EC—ethyl cellulose.

EM—electron microscopy.

ERV—Energy Recovery Ventilation. Energy Recovery Ventilation is used to provide air exchange in buildings. ERV transfers both heat and moisture between outgoing air and incoming fresh air. ERV is performed using air-to-air heat exchangers that transfer both sensible heat and latent heat.

ERV core—a heat and moisture exchanger assembled from layers or plates of membranes.

IEC—ion exchange capacity.

Microporous—refers to a material having pores with diameters less than about 0.5 microns.

$M_N$ ca.—number average molecular weight.

MW—molecular weight.

Na-sPEEK—the sodium ion form of sulfonated polyether ether ketone, wherein sulfonic acid group protons are replaced by sodium ions.

NMP—N-methyl-2-pyrrolidone.

PE—polyethylene.

% (percent) porosity—a measure of the void (i.e. "empty" spaces in a material), and is a fraction of the volume of voids over the total volume of a material as a percentage between 0 and 100%.

Permeance—vapor pressure differential normalized flux (mol m$^{-2}$ s$^{-1}$ Pa$^{-1}$) or GPU (gas permeance units), where 1 GPU=1×10$^{-6}$ cm$^3$ (STP) cm$^{-2}$ s$^{-1}$ cmHg$^{-1}$.

Permeability—thickness and vapor pressure normalized flux (mol-m m$^{-2}$ s$^{-1}$ Pa$^{-1}$) or Barrer, where 1 Barrer=1×10$^{-10}$ cm$^3$ (STP) cm cm$^{-2}$ s$^{-1}$ cmHg$^{-1}$.

PTFE—polytetrafluoroethylene.

PEEK—poly(oxy-1,4-phenyleneoxy-1,4-phenylenecarbonyl-1,4-phenylene). PEEK or 'polyether ether ketone' is a thermoplastic polymer in the polyaryletherketone family of polymers. PEEK is commercially available from different producers and at various molecular weights.

Porosity—the total void or open volume of a material.

PP—polypropylene.

RH—relative humidity.

Selectivity—the ratio of the permeance or permeability of one chemical species over another chemical species through a membrane.

SEM—scanning electron microscopy.

SMS—spun-melt-spun. A combined nonwoven fabric comprising two layers of spunbond combined with a one layer meltblown nonwoven, conformed into a layered product wherein the meltblown layer is sandwiched between the spunbond layers.

Solids content—in reference to a solution or dispersion means the amount of dry material remaining after substantially all solvent in the solution or dispersion is driven off (e.g. by drying) divided by the total mass of material and solvent in the solution or dispersion. For example, if 100 milligrams of solution or dispersion is applied to a certain area of a substrate and, after drying, a resulting layer of solids weighting 10 mg remains on the substrate then the 'solids content' of the original solution or dispersion is 10 mg/100 mg=10%.

sPEEK—sulfonated polyether ether ketone. Sulfonated polyether ether ketone is a modified type of PEEK, which is sulfonated. The degree of sulfonation of sPEEK is typically in the range of about 20% to about 100%. PEEK polymers can be sulfonated by various methods to add sulfonic acid groups to the polymer chains. Changing the DS in sPEEK causes changes in permeability, sorption, and solvent solubility properties of the polymer.

STP—standard temperature and pressure (0° C., 101325 Pa).

THF—tetrahydrofuran.

VOC—volatile organic compounds.

Weight percent—wt. %. Weight percent (wt. %) refers to the ratio of the mass of one substance ($m_1$) to the mass of a total mixture ($m_{tot}$), defined as $$\text{Weight percent} = \frac{m_1 \times 100\%}{m_{tot}}$$

WP—wet-process.

WP-PE—a porous polyethylene substrate made by a wet formation and stretching process.

WVT—water vapor transport (kg/m$^2$/day or mol/m$^2$/s).

WVTR—water vapor transport rate.

Membrane Structure

FIG. 1A shows a membrane 10 according to an example embodiment. Membrane 10 comprises a porous substrate 12 and a selective layer 14 on a surface 13 of substrate 12. Membrane 10 is air impermeable and permeable to water vapor. For ERV applications, membrane 10 is preferably much more permeable to water vapor than it is to other chemical species (e.g. volatile organic compounds). In some embodiments a porous substrate carries thin surface layers of a blend of water-permeable polymers on one surface of the substrate. Since membrane 10 is coated only on one side, there may be a preferred orientation for the membrane in certain applications. However, membranes with different properties and water transport characteristics can be obtained by applying selective layers to both sides of the substrate. In some alternative embodiments a porous substrate carries thin surface layers of a blend of water-permeable polymers on both sides of the substrate.

The permeance of water vapor through membrane 10 is affected by the pore structure and thickness of substrate 12 as well as the structure, composition, and thickness of selective layer 14.

In some embodiments membrane 10 has a thickness in the range of 10 to 100 microns, preferably 15 to 50 microns. In some embodiments membrane has a thickness less than 300 microns.

Selective Layer

Selective layer 14 forms a thin but continuous and dense (i.e. substantially free of voids) solid layer on surface 13 of substrate 12. Selective layer 14 acts as a selective barrier to air and contaminant gas transport, but permits the passage of water and water vapor.

For WVT applications, selective layer 14 is preferably sufficiently flexible to allow handling, pleating, and processing of membrane 10 to form ERV cores or other such devices. For such applications, membrane 10 typically operates in the range of about −40° C. to about 100° C.

Selective layer 14 comprises at least one sulfonated polyaryletherketone polymer blended with at least one cellulose derivative. The at least one sulfonated polyaryletherketone polymer comprises sulfonated polyether ether ketone (sPEEK) in some embodiments. The at least one cellulose derivative may comprise cellulose acetate (CA), cellulose acetate propionate (CAP), cellulose acetate butyrate (CAB), ethyl cellulose (EC), or combinations thereof, preferably CA. In some embodiments selective layer 14 comprises sPEEK blended with CA.

In some embodiments selective layer 14 may further comprise desirable additives such as one or more of: flame retardants, additional desiccants, zeolites, inorganic additives (such as silica, titania, and lumina), plasticizers, surfactants, desiccant salts, and microbicides.

In some embodiments the acetyl content of the cellulose derivative is between about 20% to about 62%, preferably about 40%. For WVT applications, the acetyl content of CA may be between about 20% to about 62%, preferably about 40%. In general, increasing the acetyl content of CA tends to increase its solvent resistance and glass transition temperature while decreasing its water vapor permeability. Thus, the acetyl content of CA may be selected so that the selective layer has good transport properties for vapor separation applications (i.e. one or more of the following properties: high WVT; low contaminant crossover; and compatibility with a suitable solvent for solubilizing CA and the sulfonated polyaryletherketone polymer such as sPEEK).

In some embodiments the average $M_N$ ca. of the cellulose derivative is about 12,000 to about 122,000. For WVT applications, the average $M_N$ ca. of CA may be about 30,000 to about 122,000, preferably about 50,000.

In some embodiments the degree of sulfonation (DS) of the sulfonated polyaryletherketone polymer, such as sPEEK, is in the range of about 23% to about 100%, preferably about 60% to about 70%. For WVT applications, the DS of sPEEK may preferably be in the range of about 60% to about 70%. Below about 60% DS, the sPEEK polymer may be insoluble in acetone/water and methanol/water solutions. Above about 70% DS, the sPEEK polymer may be soluble in both acetone/water and methanol/water solutions, but casting thin, dense (i.e. substantially free of voids), and defect-free film layers on microporous substrates may be difficult. Further, above about 70% DS, volatile organic compounds (VOC) crossover may be increased under high humidity conditions. At very high DS, sPEEK may be soluble in water.

In some embodiments the average $M_N$ ca. of the sulfonated polyaryletherketone polymers is about 20,000 to about 180,000. For WVT applications, the average $M_N$ ca. of sPEEK may be about 20,000 to about 180,000.

In some embodiments the protons of the sulfonic acid groups of the sulfonated polyaryletherketone, such as sPEEK, are exchanged for sodium, lithium, or another cation as described elsewhere herein.

Selective layer 14 may be selected to have the ability to transport water vapor as well as condensate in the form of liquid water. Water transport is driven by diffusion through selective layer 14 by a concentration gradient from a wet side of membrane 10 to a dry side of the membrane. The thickness of selective layer 14 affects the rate of water transport through it, so that a thicker selective layer will tend to have a lower rate of water transport. Thus, it is desirable to reduce the selective layer thickness in order to increase the water transport rate without unduly compromising the selectivity of the membrane (and the ability of the membrane to act as a barrier to gas mixing).

In some embodiments the coating loading of selective layer 14 on substrate 12 is in the range of about 0.1 g/m² to about 10 g/m², preferably in the range of about 0.5 g/m² to about 2.5 g/m². In some embodiments the loading of selective layer 14 on substrate 12 is less than about 5 g/m².

In some embodiments the thickness of selective layer 14 on substrate 12 is in the range of about 0.1 micron to about 10 microns, preferably about 0.5 micron to about 2 microns, more preferably about 0.75 micron to about 1.25 microns. In some embodiments the thickness of selective layer 14 on substrate 12 is less than about 5 microns.

The selectivity of a material refers to the ratio of the permeance or permeability of one chemical species over another chemical species through a membrane. For ERV applications, an important aspect of the selectivity of the membrane is the relative permeability of desired molecules (i.e. water vapor) over undesirable compounds (for example, carbon dioxide, VOCs). Polymers with high permeability and high selectivity for water vapor are desirable for use in ERV membranes. However, materials with high permeability for one compound often also have high permeability for other compounds (i.e. low selectivity). Further, the presence of humidity in the airstream that is in contact with the coated surface of a membrane can have a 'plasticizing' effect when water vapor is absorbed into the polymer film. This can lead to decreased selectivity under high humidity conditions. It is desirable to reduce this effect.

By appropriately selecting the polymer blend of the selective layer one may alter the functional relationship between water vapor permeability and selectivity. In some embodiments the water vapor permeance of sulfonated polyaryletherketone/cellulose derivative coated membranes is at least about 6,000 GPU, preferably at least about 9,000 GPU at about 50% relative humidity in the temperature range of about 25° C. to about 50° C. and/or the AA (or other VOCs) crossover of sulfonated polyaryletherketone/cellulose derivative coated membranes is less than about 1% at about 50% relative humidity at about 25° C., preferably less than about 3% at about 70% relative humidity at about 25° C., more preferably less than about 1% at about 70% relative humidity at about 25° C. and less than about 10% at about 90% relative humidity at about 25° C., preferably less than about 6% at about 90% relative humidity at about 25° C., more preferably less than about 3% at about 90% relative humidity at about 25° C. The selectivity of water vapor over AA or other VOCs is greater than about 100 at about 30% relative humidity at about 25° C., greater than about 50 at about 50% relative humidity at about 25° C., greater than about 20 at about 70% relative humidity at about 25° C., and greater than about 5 at about 90% relative humidity at about 25° C.

The water vapor transport, permeance, and permeability and/or the selectivity of the membrane may be affected by one or more of temperature, humidity, and selective layer thickness. For such membranes, at a given temperature higher humidity may increase water vapor permeability and lower humidity may decrease water vapor permeability. Temperature may affect the permeability of a membrane by changing the rate of diffusivity through the membrane or the sorption of water vapor or other chemical species into the membrane. Relative humidity, vapor pressure, or chemical potential of water in the membrane may affect one or more of the permeability of the membrane to chemical species and/or the selectivity of the membrane. In some embodiments when the temperature is about 25° C., and/or the RH is about 50%, and/or the thickness of the selective layer is about 0.5 microns to about 2 microns, preferably about 0.75 microns to about 1.25 microns, the permeance of sulfonated polyaryletherketone/cellulose derivative coated membranes is at least about 6,000 GPU to greater than about 15,000 GPU, and/or the selectivity of the membrane for water vapor over AA of sulfonated polyaryletherketone/cellulose derivative coated membranes is greater than about 20, preferably greater than 50, and/or the acetic acid (AA) crossover is less than about 1%. At about 70% relative humidity the AA selectivity is greater than about 20 and the AA crossover is preferably less than about 3%.

By appropriately selecting the polymer blend of the selective layer one may alter the functional relationship between water vapor permeability and/or selectivity and temperature and/or RH.

As described elsewhere herein, compared to sPEEK coated membranes, membranes coated with a blend of sPEEK and CA demonstrate improved high humidity selectivity (measured as a lower acetic acid crossover (AA crossover) at about 90% RH) and comparable WVT. Further, as described elsewhere herein, compared to sPEEK coated membranes at the same thickness of selective layer 14 on substrate 12, sPEEK/CA membranes demonstrate significant reductions in AA and ethanol crossover at higher humidities (i.e. about 50% RH to about 90% RH).

In some embodiments when the temperature is about 25° C., and/or the RH is about 50%, and/or the thickness of the sPEEK/CA selective layer on substrate 12 is in the range of about 0.5 microns to about 2.5 microns, the water vapor permeance of sPEEK/CA coated membranes is in the range of about 6,000 GPU to about 15,000 GPU and/or the AA crossover of sPEEK/CA coated membranes is in the range of about 0% to about 2%. In some embodiments when the temperature is about 25° C., and/or the RH is about 90%, and/or the thickness of the sPEEK/CA selective layer on substrate 12 is in the range of about 0.5 microns to about 2.5 microns, the water vapor permeance of sPEEK/CA coated membranes is in the range of about 6,000 GPU to about 15,000 GPU and/or the AA crossover of sPEEK/CA coated membranes is less than about 6%. Water vapor permeance is similar for both sPEEK and CA membranes at about 25° C. and about 50° C., but selectivity of the sPEEK/CA membrane is improved relative to the sPEEK membranes at higher relative humidity conditions.

By appropriately selecting the polymer blend of the selective layer as described elsewhere herein, the WVT rate (WVTR) increases when the selective layer is exposed to higher RH or to higher temperature at same RH.

In any of the above embodiments, the sPEEK/CA selective layers may comprise an sPEEK:CA (wt.:wt.) ratio in the range of about 1:9 to about 9:1, preferably about 7:3 to about 2:3 or be formulated from an sPEEK/CA coating solution or dispersion comprising an sPEEK:CA (wt.:wt.) ratio in the range of about 1:9 to about 9:1, preferably with an sPEEK:CA (wt.:wt.) ratio in the range of about 2:3 to about 7:3, and/or a weight percent of sPEEK and CA in the range of about 1 wt. % to about 10 wt. %, preferably about 5 wt. %, in an acetone/water solvent or an acetone/water/ethanol solvent, preferably comprising about 70/30 to about 80/20 (wt./wt.) acetone/water or about 58/22/20 to about 65/25/10 (wt./wt./wt.) acetone/water/ethanol.

Selective layer 14 may have any combination of the above characteristics.

Selective Layer Coating Solution or Dispersion Formulation

Selective layer 14 can be applied directly to substrate 12 by a coating rod, slot-die, or similar device. In rod coating thickness may be controlled by the rod selection, solution viscosity, as well as the solids content in the coating solution. In slot die coating, the thickness can be controlled by the slot size, the fluid pumping rate, and solution solids content. Suitable application methods include dip-coating, Mayer rod, blade over roller coating, direct gravure, offset gravure, kiss coating, slot die and spray-coating. The wet, coated substrate is then typically passed through a dryer or oven to remove excess solvent and cause the coating to adhere to the substrate surface. Drying may be achieved, for example, through heated air drying by convection. Production of these membranes can be completed on roll-to-roll equipment in a continuous process, allowing for high volume, low cost manufacturing.

Selective layer 14 may be prepared by applying a solution or dispersion comprising a sulfonated polyaryletherketone/ cellulose derivative to substrate 12 as a coating. The coating may be dried until it is mostly free of solvent wherein a sulfonated polyaryletherketone/cellulose derivative selective layer covers a surface of the substrate continuously.

Solvent systems found to dissolve both sPEEK and CA include but are not limited to acetone/water, THF, THF/ water, NMP, NMP/water, DMF, DMF/water, DMSO, DMSO/water, preferably acetone/water, acetone/water/ethanol, or another ternary solvent system. Acetone/water or acetone/water/ethanol may be used to achieve thin, defect-free sPEEK/CA selective layers on a substrate surface.

In some embodiments, sPEEK/CA coating solutions or dispersions may comprise an sPEEK:CA (wt.:wt.) ratio in the range of about 7:3 to about 2:3, and/or a weight percent of sPEEK and CA in the range of about 2.5 wt. % to about 10 wt. %, preferably 5 wt. %, and/or an acetone/water solvent, preferably comprising about 70/30 to about 80/20 (wt./wt.) acetone/water or acetone/water/ethanol solvent, preferably comprising about 58/22/20 to about 65/25/10 (wt./wt./wt.) acetone/water/ethanol or another ternary solvent system.

Acetone/water solutions of sPEEK/CA have pH of about less than about 1. However, acidic pH degrades CA in solution by acid hydrolysis. This degradation will continue even after the sPEEK/CA coating solution is dried due to the presence of acetic acid generated during hydrolysis of the CA. This degradation can have an effect on the water vapor transport performance and lifetime of the membranes. To substantially eliminate CA degradation, a cation form of sPEEK may be used, wherein the protons of the sPEEK sulfonic acid groups are exchanged for sodium ions, lithium ions, or other monovalent cations (such as potassium ions) or divalent cations (such as calcium ions or magnesium ions). Preferably, sodium ions are used. Degradation of CA in sPEEK/CA coating solutions and sPEEK/CA selective layers is substantially eliminated by neutralizing/exchanging sPEEK in this way. Further, the WVT properties of neutralized/exchanged-sPEEK/CA selective layers are substantially maintained.

In some embodiments, about 80% to about 100% of the sulfonic acid group protons of sPEEK may be exchanged for sodium, lithium, or another cation. For example, the protons of the sulfonic acid groups of sPEEK may be exchanged for sodium ions by adding NaHCO$_3$ or NaOH dropwise to an acetone/water solution of a blend of the sPEEK and cellulose derivative until the pH of the solution is between about 5 to about 6. In some embodiments the exchange of protons for cations can be completed before the cellulose derivative polymer is added. Sodium salts other than NaHCO$_3$ (such as Na$_2$CO$_3$) may be used for the ion exchange. Alternatively, sPEEK may be treated with excess NaOH solution (such as 0.1 M NaOH), in which the polymer is soaked in 0.1 M NaOH solution and rinsed with deionized water until the pH of the wash solution is neutral (i.e. pH is about 7), and the resulting Na-sPEEK washed with deionized water and dried. Exchange of protons can also be completed after coating the substrate with sPEEK/CA and drying. In this case, salts such as NaCl or KCl could be used as the cation source. Persons skilled in the art will recognize that the sulfonic acid group protons of other sulfonated polyaryletherketons may be replaced with cations as described above for sPEEK.

Substrate

Substrate 12 provides most of the mechanical support and largely determines the handling characteristics of membrane 10. For ERV applications, substrate 12 preferably has the mechanical properties required in order be formed into an ERV core and to be integrated into an ERV system. These properties may include one or more of the following: the ability to hold a pleat or fold; the ability to be thermoformed; tear-resistant; sufficiently rigid to support itself between ribs or other supports without undue deformation; and the ability to be thermally-, vibration- or ultrasonically-welded. These properties may be advantageous when handling, sealing, and/or bonding membrane 10 and/or creating flow pathways from membrane 10 and/or on membrane 10 surfaces when assembling an ERV core.

Substrate 12 may have a high porosity. In some embodiments, substrate 12 has a porosity of at least about 30%, preferably in the range of about 30% to about 80%) and/or is thin (e.g. has a thickness of less than about 250 microns) and/or is hydrophobic.

Higher porosity and lower thickness of the substrate helps decrease the resistance to water and water vapor transport (WVT) through the substrate portion of the membrane. High porosity and low thickness are desired with the constraint that the substrate should provide sufficient mechanical strength to withstand expected handling without damage. The pore size is preferably just small enough to allow a continuous coating of polymer to be formed on the surface of the substrate.

In some embodiments the substrate has one or more of these features. Substrates of particular embodiments have a thickness that is <250 microns, preferably in the range of about 4 microns to about 150 microns, more preferably in the range of 5 to 40 microns.

In some embodiments the average pore size of the substrate is in the range of about 5 nm to about 1,000 nm in the width or length direction, preferably in the range of about 5 nm to about 500 nm in the width or length direction.

Figure 1B:
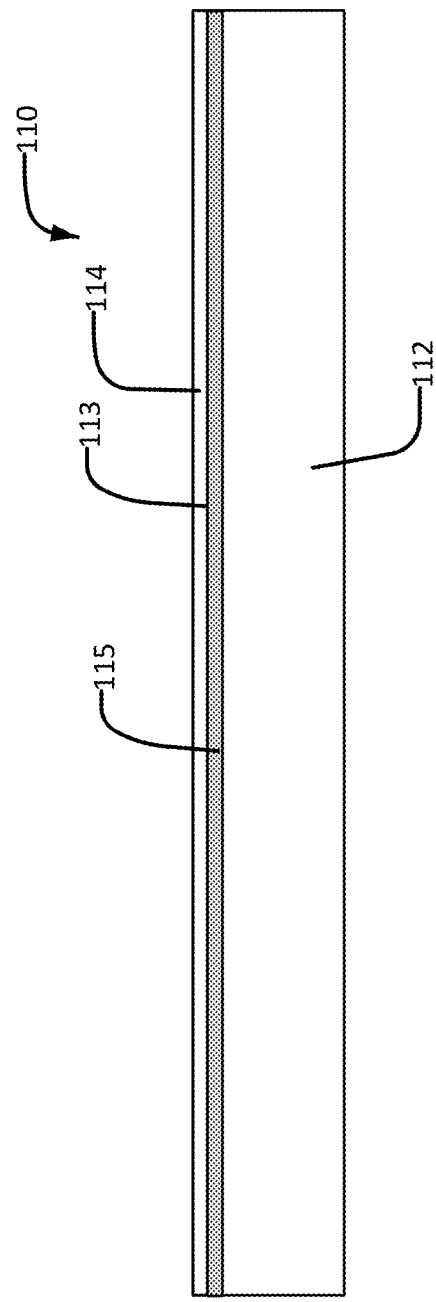
FIG. 1B is a schematic illustration showing a membrane according to an example embodiment.

Suitable substrates may comprise electro spun nanofibrous layers (supported on a macroporous substrate layer). Fibers may be electro spun from polymer solutions and deposited on a carrier layer (such as a non-woven). Sulfonated polyaryletherketone blend formulations can then be coated on or impregnated into the nanofibrous layer using conventional coating methods (such as gravure or slot die coating). FIG. 1B shows a membrane 110 according to an example embodiment. Membrane 110 comprises an electro spun nanofibrous layer 115 supported on a macroporous substrate layer 112. A selective layer 114 is coated on a surface 113 of nanofibrous layer 115, and may impregnate the nanofibrous layer. Membrane 110 is air impermeable and permeable to water vapor. As described elsewhere herein, selective layer 114 may comprise at least one sulfonated polyaryletherketone blended with at least one cellulose derivative. Substrates comprising electro spun nanofibrous layers may be impregnated or surface coated with sulfonated polyaryletherketone blends, such as sPEEK blended with CA. An advantage of utilizing nanofibrous scaffolds as a basis for membrane fabrication is that selective layer 114 can be coated on a wide variety of support layers, allowing for the creation of formable membrane materials.

Suitable substrates may be polymeric, such as a polyolefin (e.g. polyethylene (PE)) with desiccant or silica additives such as silica or various inorganic fillers (e.g. oxides of silicon, titanium, aluminum). In some embodiments the substrates comprise uni-axially or bi-axially stretched polyolefins such as polyethylene (PE) or polypropylene (PP). These porous polyolefins can be supplied as multilayer laminates of single polymers (PE or PP) or of multiple polymers (PP/PE/PP, etc.) or as individual films of different thicknesses. Other suitable substrates include expanded polytetrafluoroethylene (PTFE), UHMWPE fibrous porous substrates or other filler-loaded polymer films.

Suitable substrates may be made from a microporous polyolefin material. In some embodiments the microporous polyolefin substrate may be produced by a dry-process or a wet-process. For example, in some embodiments the substrate comprises a dry-process polypropylene (DP-PP) battery separator. Such separators are used, for example, in some lithium ion batteries. Such separators are commercially available and are reasonably inexpensive in commercial volumes.

In wet-process fabricated substrates, a plasticizer-loaded polyolefin film is extruded as a gel. The plasticizer is then extracted with a solvent leaving a polyolefin skeleton film with an open pore structure. The pore structure of the polyolefin can then be further modified by stretching. In a dry-process, the polyolefin is extruded as a melt, aligning the polymer lamellae; this polymer film is then annealed, and then stretched orthogonally to the aligned direction to induce controlled tearing of the polymer structure, leading to a microporous structure (see, for example, S. S. Zhang, "A review on the separators of liquid electrolyte Li-ion batteries," Journal of Power Sources, vol. 164, no. 1, pp. 351-364, January 2007 and P. Arora and Z. (John) Zhang, "Battery Separators," Chem. Rev., vol. 104, no. 10, pp. 4419-4462, October 2004).

If the substrate is made of a highly porous material with a large pore size, the coating making up selective layer 14 will tend to penetrate the pores prior to drying, leading to partial or full impregnation of the substrate. This is not desirable since an impregnated substrate will tend to have a greater resistance to water transport than a membrane comprising a thin surface coating of a selective polymer. Penetration of the polymer into the substrate occurs more readily in substrates that are fibrous in nature. Such substrates tend to 'wick in' polymer coating solutions or dispersions, and have less defined surface pore structures. More fibrous substrates also tend to have greater pore size distributions and larger average pore sizes, leading to more penetration of the polymer into the substrate. Thus, the substrate preferably has high porosity but a small pore size, a narrow pore size distribution, and a well-defined surface pore structure to facilitate coating selective layer 14 onto the substrate with little or no impregnation into the pores of the substrate.

Polyolefin substrates made using a wet-process tend to have a greater pore size distribution and often a greater average pore size. Thus, the coating making up selective layer 14 will tend to penetrate the pores of wet-process polyolefin substrates, leading to a polymer-impregnated substrate. Such membranes tend to have a thicker selective layer and lower WVT performance.

In contrast, microporous polyolefin substrates produced using a dry-process tend to have a more definite surface pore structure, with a narrower pore size distribution, and may be coated with little or no impregnation of the polymer into the substrate. Rather cross-sectional scanning electron microscopy (SEM) images show that a well-defined coating layer remains at the surface of dry-process substrates. The use of dry-process substrates has been found to allow for fabrication of membranes comprising selective layers with a lower effective thickness than when the same coatings are cast on wet-process substrates, which allows for higher WVT performance.

Further, polyolefin substrates made using a dry-process tend to have higher humidity selectivity than wet-process polyolefin substrates. For example, as described elsewhere herein, membranes comprising DP-PP substrates have high humidity selectivity (measured as a low acetic acid crossover (AA crossover) at a relative humidity (RH) of about 90%) relative to membranes comprising WP-PE substrates or silica polyethylene (Si-PE) substrates.

Suitable substrates may comprise non-polymeric microporous materials (e.g. glass-fiber based materials). As described elsewhere herein, selective layer 14 may comprise at least one sulfonated polyaryletherketone with at least one cellulose derivative. Non-polymeric microporous substrates may be impregnated or surface coated with sulfonated polyaryletherketone blends to give membranes with desirable properties for some applications. In some embodiments free-standing films of the sPEEK blends can be cast and laminated on to a support layer.

Suitable substrates may comprise laminated layers for improving the handling properties of thin substrates. For example, a mechanical support layer such as a non-woven (for example, spun-bond, melt blown, spun-melt-spun (SMS), which has a low basis weight (<100 g/m$^2$, preferably <35 g/m$^2$) and high porosity, may be laminated (for example, by heat or adhesive) with the substrates described elsewhere herein.

Substrate 12 is preferably inherently flame retardant (i.e. made of one or more flame retardant materials) and/or tends to shrink away from high-temperature sources such as open flames. These properties help membrane 10 to pass flammability testing (e.g. according to UL-94, UL-723). Since the substrate tends to constitute the major portion by weight of the final membrane, if the substrate is flame retardant, then it can be expected that the membrane itself will also be flame retardant.

In some embodiments substrate 12 does not promote and/or is resistant to microbial growth.

Substrate 12 may have any combination of the above characteristics.

Additives

The properties of membrane 10 can be further enhanced for the particular end-use application by incorporating additives into the selective layer, as described in U.S. patent application Ser. No. 13/321,016 (published as US 2012/0061045) which is hereby incorporated by reference in its entirety. Additives include, but are not limited to, flame retardants, desiccants, zeolites, inorganic additives (such as silica, titanic, and alumina), plasticizers, surfactants, desiccant salts, and microbicides.

Method of Manufacture

Figure 2:
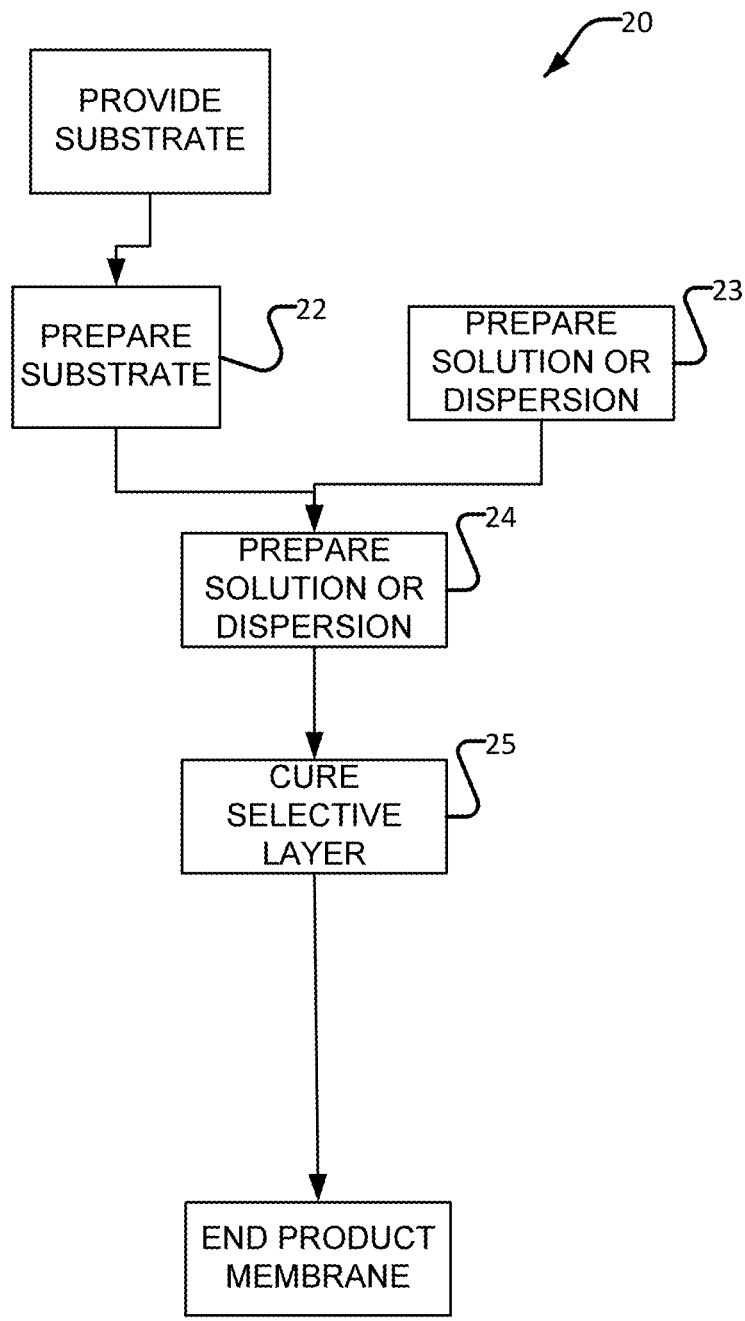
FIG. 2 is a flow chart which illustrates methods for making membranes according to some embodiments.

FIG. 2 illustrates a method 20 for making a membrane. In block 21 a suitable substrate is provided. The substrate may, for example, be as described above. In some embodiments the substrate is a dry- or wet-process polypropylene or polyethylene substrate. In optional block 22 the substrate is prepared to receive the selective layer 14. Block 22 may, for example, comprise corona treatment of the substrate.

In block 23 a solution or dispersion is prepared for use in creating the selective layer. The solution or dispersion contains at least one sulfonated polyaryletherketone polymer (such as sPEEK) blended with at least one cellulose derivative (such as CA) and optionally contains other additives as described elsewhere herein.

In example embodiments the weight percent of the sulfonated polyaryletherketone polymer/cellulose derivative making up the solution or dispersion used in forming the selective layer is in the range of about 1 wt. % to about 10 wt. %, preferably about 5 wt. %. Using solutions or dispersions with a lower weight percent of sulfonated polyaryletherketone polymer/cellulose derivative yield thinner coating layers.

In block 24 the solution or dispersion prepared in block 23 is applied to the substrate to create the selective layer. Without being limited to a specific method, application may for example comprise gravure coating, meter rod coating, roll coating, slot die coating or spray coating. Slot die coating is preferred to provide thin uniform coatings on the substrate surface.

In block 25 the selective layer is dried (i.e. physically cured). After drying, a continuous dense film layer of sulfonated polyaryletherketone polymer/cellulose derivative covers the substrate surface. The dense layer is substantially free of pores. In some embodiments the thickness of the selective layer is in the range of about 0.1 to about 10 microns (for example, a coating weight of about 0.1 to about 10 g/m$^2$).

The selective layer may be dried in air. In some embodiments the coated substrate may be dried in air at a temperature of about 20° C. to about 90° C. Drying may be expedited by heating the coated substrate. For example, in other embodiments drying occurs in a roll-to-roll process in a heated convection oven. In such embodiments, drying of the selective layer may be completed in a time on the order of 30 seconds or less.

In a method according to an example embodiment, a membrane 10 is prepared by applying a film comprising an sPEEK/CA dispersion to a DP-PP substrate 12. The film is allowed to dry. The sPEEK/CA selective layer covers a surface of the substrate continuously.

Pore Formation on Phase Inversion

In the present process, depending on conditions, once the selective layer coating solution/dispersion is applied to substrate 12, the solvent may begin to evaporate rapidly. Solvents with higher vapor pressure may evaporate faster than higher boiling solvents. Since the selective layer comprises a blend of two polymers with varying levels of solubility in the chosen solvent, there is a possibility for 'phase inversion' in the selective layer. For example, phase inversion may occur in acetone-water solutions of sPEEK/CA due to the rapid evaporation of acetone and the insolubility of CA in water.

Phase inversion occurs as polymer rich and polymer lean phases develop in the coating layer during drying. For example, in an acetone/water/CA system, CA is more soluble in acetone (solvent) than water (non-solvent) and acetone evaporates at a higher rate than water from the coating layer. During drying the coating layer separates into polymer rich and polymer lean phases, the polymer rich phase solidifying before the polymer lean phase and the polymer lean phase forming pores in the polymer rich phase. When completely dried, pores remain throughout the film layer. In an acetone/water/sPEEK/CA system, sPEEK is more soluble in lower acetone/water ratios than CA. During drying, as acetone evaporates sPEEK remains in solution longer and pores are therefore less likely to form when sufficient sPEEK is present.

Pore formation by phase inversion is generally undesirable in preparing membrane 10. Porous phase inversion membranes and layers tend to be fragile, brittle, and prone to fracture and failure when compressed, bent, folded, or handled due to their pore structure and high number of interphases making handling membrane and/or pleating the membrane into exchanger modules problematic.

Further, selective layer 14 should be dense (i.e. substantially free of voids) and non-porous in order to provide selective transport of water vapor over other gases and VOCs. In contrast, phase inversion membranes tend to be porous. Phase inversion may be reduced or avoided by modifying one or more of the following: the solvent ratios, the polymer solids content, the polymer ratios, the drying rate, and/or the film thickness. For example, pore formation by phase inversion is greater when the solids content of the coating is lower.

Adding other solvents and/or non-solvents to the system may also impact pore formation by phase inversion. For example, CA is not soluble in ethanol or water, but ethanol is a more volatile non-solvent than water. By adding ethanol to a acetone/water/sPEEK/CA system, pore formation by phase inversion is reduced. For example, when the total wt. % of ethanol in the system is greater than about 10 wt. %, preferably greater than about 15 wt. %, pore formation by phase inversion was observed to decrease.

No significant pores were observed resulting from phase inversion for membranes comprising an sPEEK/CA selective layer wherein the sPEEK:CA ratio is in the range of about 2:3 to about 1:0 (solids content of the coating solution in the range of about 4 wt. % to about 10 wt. % in about 70/30 to about 80/20 (wt./wt.) acetone/water) for selective layers up to 2 microns in thickness on a microporous DP-PP substrate. No significant pores were observed resulting from phase inversion for sPEEK/CA films wherein the sPEEK:CA ratio is in the range of about 2:3 to about 1:0 (case from an acetone/water system). In contrast, pores were clearly observed in the surface and throughout sPEEK/CA films having sPEEK:CA ratios less than 1:2 (for example, 1:3) due to phase inversion when cast from acetone/water systems.

Figure 3:
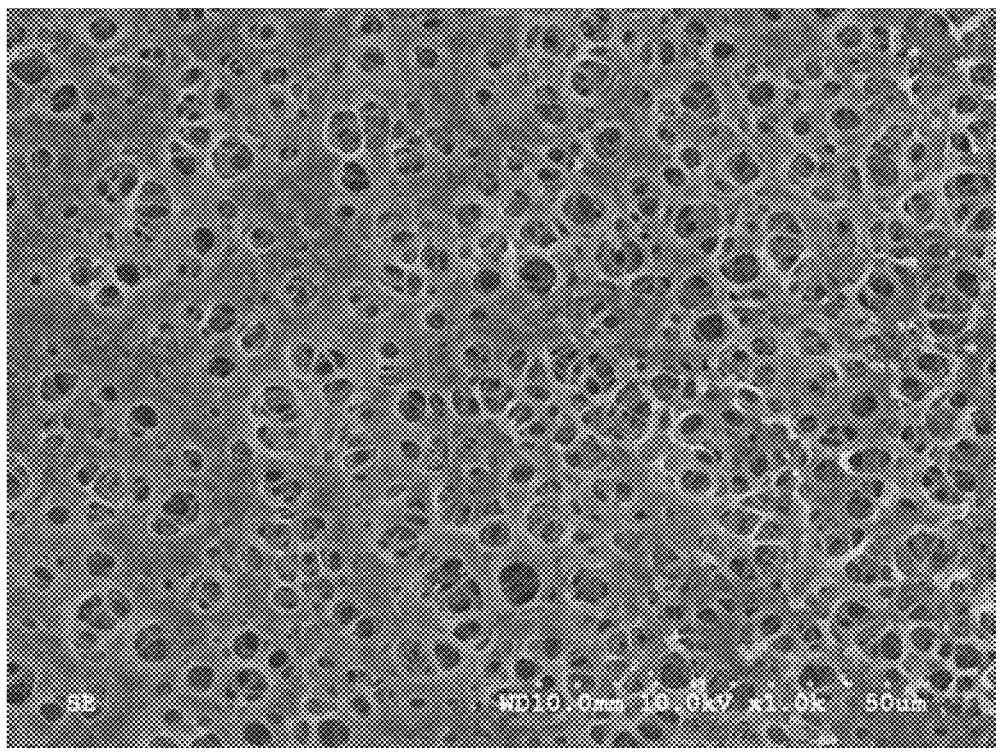
FIG. 3 is an image of the surface of a sample film according to an example embodiment.
Figure 4:
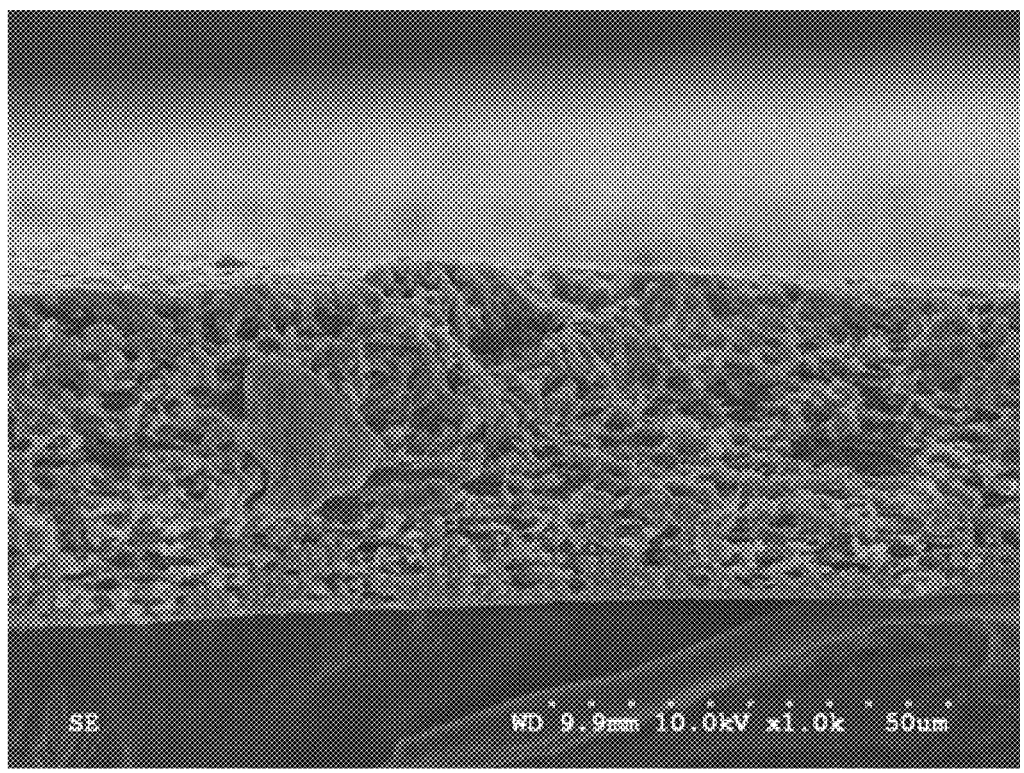
FIG. 4 is a cross-sectional image of a sample film according to an example embodiment.
Figure 5:
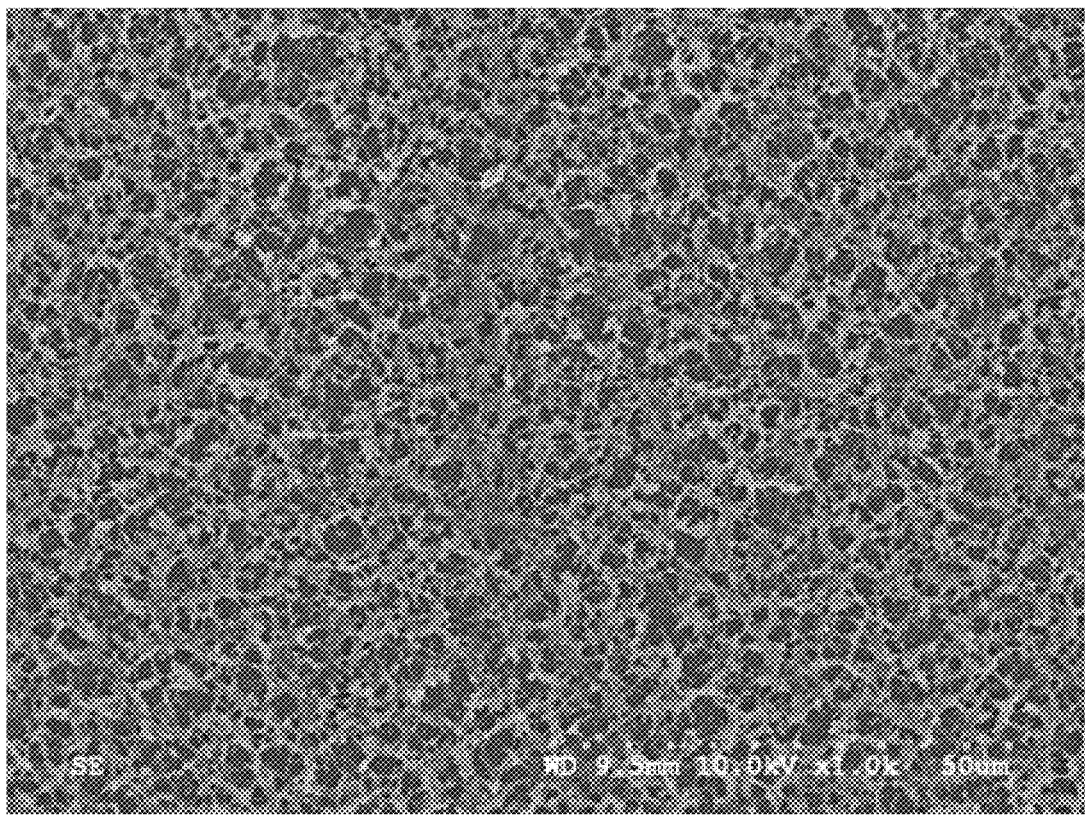
FIG. 5 is an image of the surface of a sample membrane according to an example embodiment.

FIGS. 3 and 4 show surface and cross-section images, respectively, of an unsupported sPEEK/CA film cast from 80/20 (wt./wt.) acetone/water wherein the sPEEK:CA ratio was 1:2. Complex pore structures in the surface and throughout the sPEEK/CA films were also clearly observed in membranes comprising an sPEEK/CA selective layer wherein the solids content formulation of the selective layer was less than about 3% in 80/20 (wt./wt.) acetone/water. FIG. 5 shows an electron microscopy (EM) image of the surface of a membrane comprising an sPEEK/CA selective layer cast on DP-PP and having an sPEEK:CA ratio of 1:1 (cast from a 2.5% solids content formulation in 80/20 (wt./wt.) acetone/water). The pore structure observed is believed to have been created by phase inversion. Simple bending, folding, and pleating tests caused such phase inversion induced porous membranes to crack, leading to increased air crossover. Membranes having a 'glossy' film layer surface showed no surface or through porosity, or evidence of pores formed by phase inversion, under EM. These membranes could be bent, folded, and pleated without demonstrating an increase in air crossover.

Polymer-polymer Phase Separation in Films

Polymer blends, particularly those that are incompatible and cannot completely intersperse on the molecular level may tend to thermodynamically separate into 'phase separated' solids regions containing the individual polymer components to reduce or minimize free energy in the film layer. This may happen during drying/solvent evaporation and/or during thermal treatment. These non-porous phase separated film layers can have positive and negative effects on the bulk performance properties of the film.

In selective layer 14, some degree of polymer-polymer phase separation of sPEEK/CA selective layers is often desirable. For example, regions of CA (which have lower swelling in the presence of water) may constrain higher swelling sPEEK regions, prevent excess dimensional instability of the selective layer in the presence of higher RH, and decrease permeability of the selective layer to VOCs and other gases in the presence of high RH. When pore formation is substantially avoided, polymer-polymer phase separation may also be beneficial for preventing mechanical failure of the selective layer due to extreme swelling and contracting of sPEEK under varying RH conditions and in the presence of liquid water condensation. Further, defined regions of sPEEK (which have higher water vapor permeability) may allow higher localized WVT (i.e. more defined regions of the polymer containing sulfonic acid groups may improve water vapor transport).

Figure 6:
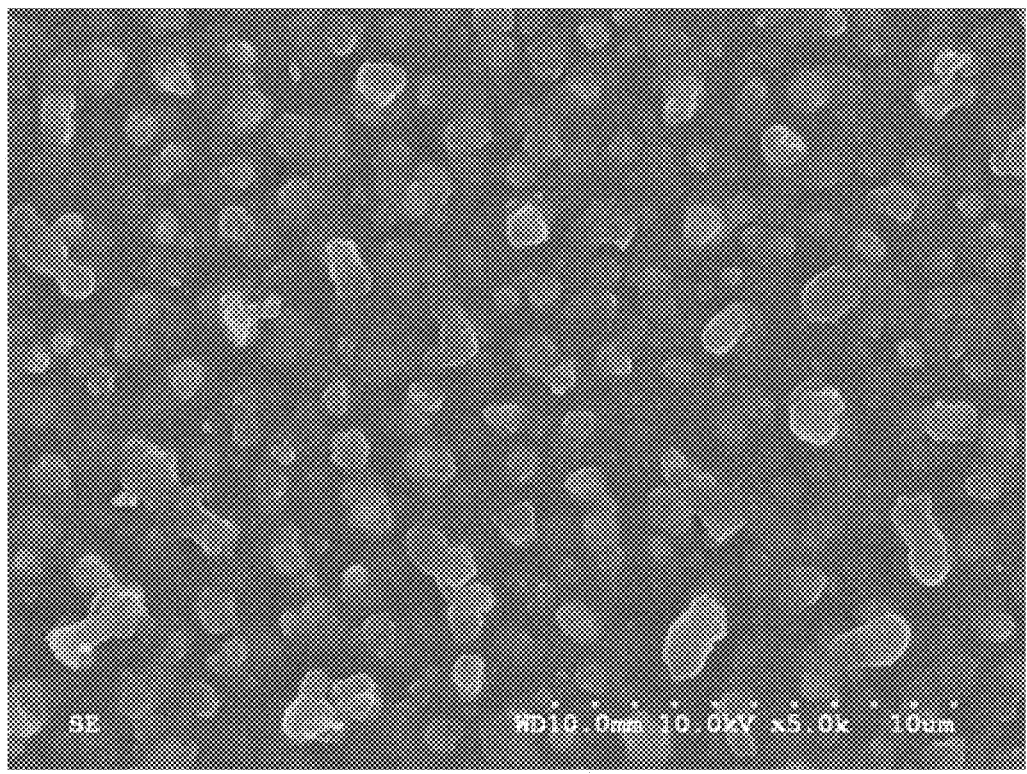
FIG. 6 is an image of the surface of a sample film according to an example embodiment.
Figure 7:
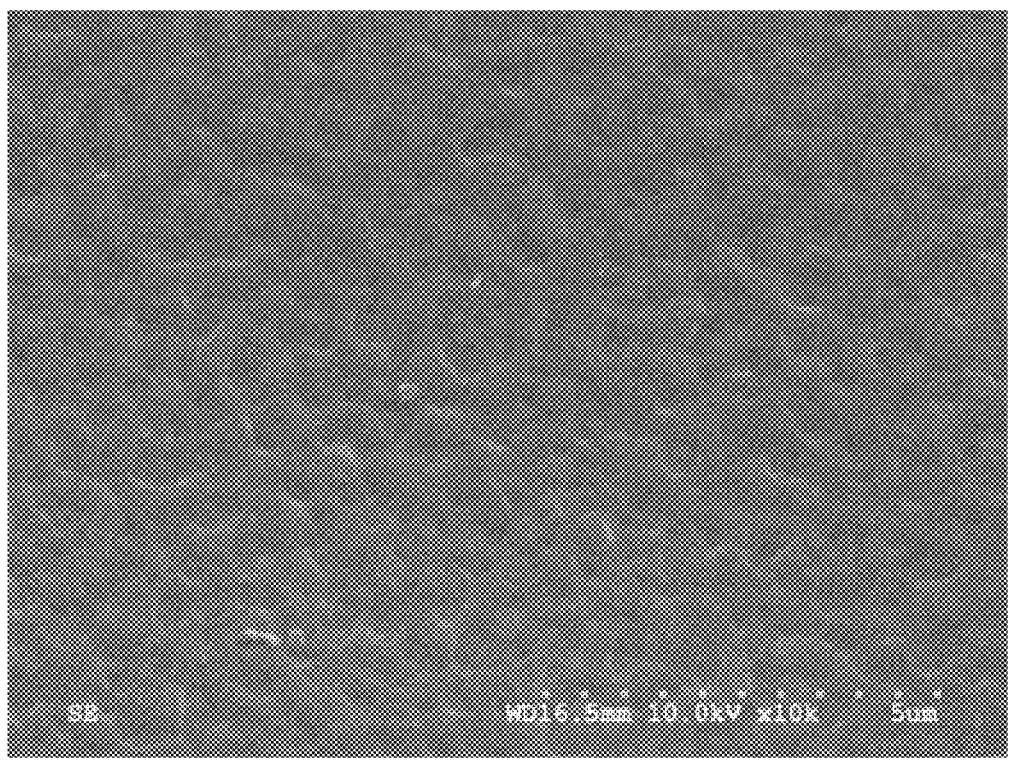
FIG. 7 shows an image of the surface of a sample membrane according to an example embodiment.
Figure 8:
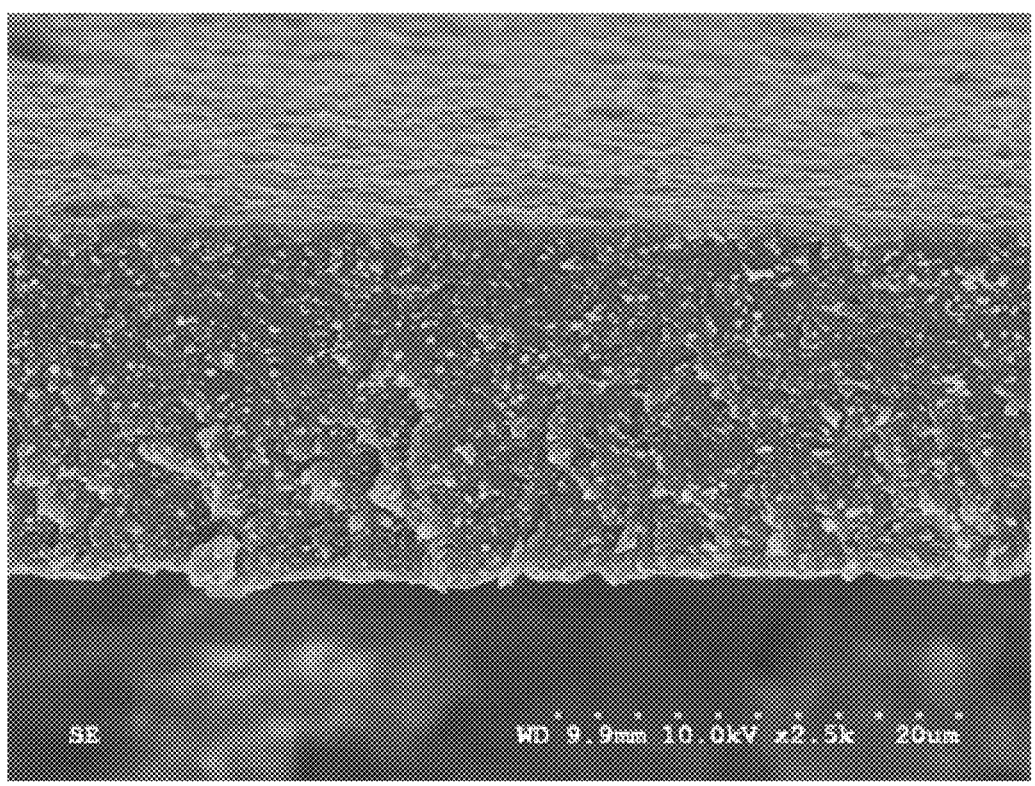
FIG. 8 shows a cross-sectional image of a sample film according to an example embodiment.
Figure 9:
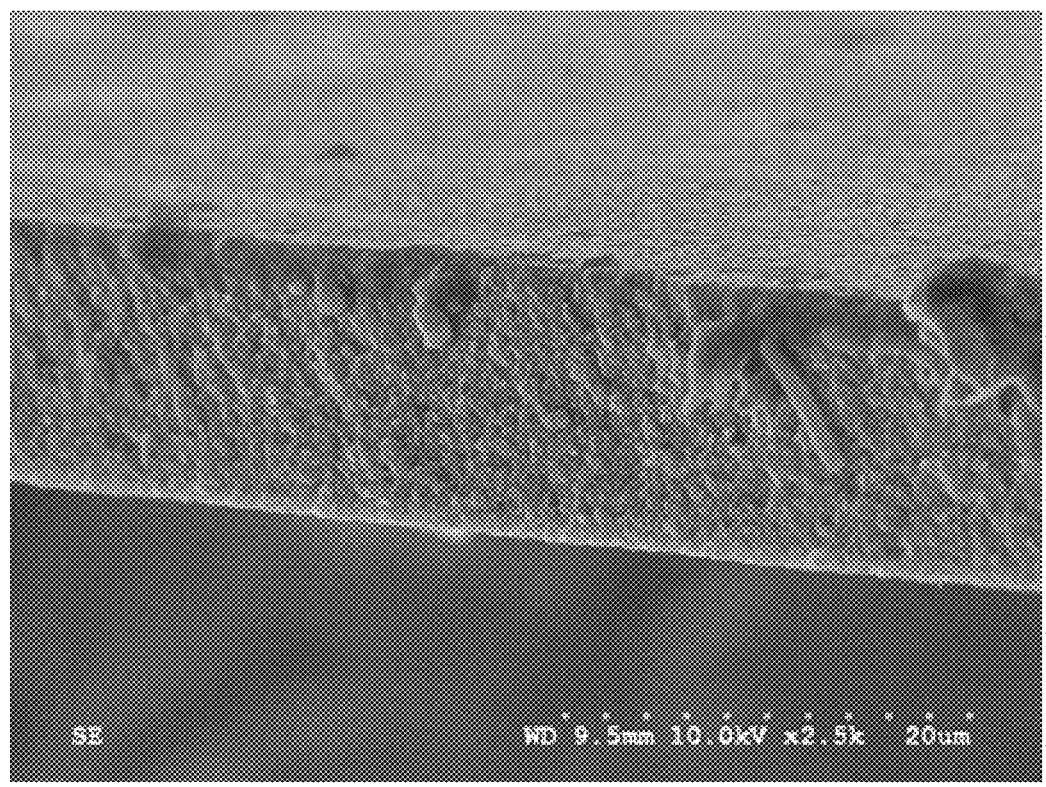
FIG. 9 shows a cross-sectional image of a sample film according to an example embodiment.

Blending polymers in different ratios will lead to different levels or morphologies of phase separation. Membranes comprising sPEEK/CA selective layers formulated from an sPEEK/CA coating solution having an sPEEK:CA (wt.:wt.) ratio in the range of about 7:3 to about 2:3 demonstrate polymer-polymer phase separation of sPEEK and CA without pore formation (FIGS. 6-9). FIG. 6 shows a 2:1 (wt.:wt) sPEEK:CA film surface having polymer-polymer phase separation induced morphology. No pores are seen in the film surface. FIG. 7 shows a DP-PP substrate coated with about a 1 micron film of a 1:1 (wt.:wt.) sPEEK:CA coating solution (5 wt. % polymer solids in a 72/28 acetone/water solution). The coating morphology suggests that distinct polymer phases were formed, but no pores. FIGS. 8 and 9 show cross-sections of films cast from 1:1 (wt.:wt.) sPEEK:CA and 2:3 (wt.:wt) sPEEK:CA formulations, respectively, cast from acetone/water. These films did not demonstrate phase inversion induced pores (as observed for the 1:2 (wt.:wt.) sPEEK:CA film shown in FIG. 4); however, polymer-polymer phase separation is observable in the film morphology shown in FIGS. 8 and 9. Phase inversion (i.e. pore formation) was not observed for membranes comprising sPEEK:CA selective layers formulated from an sPEEK/CA coating solution having an sPEEK:CA (wt.:wt.) ratio in the range of about 7:3 to about 2:3 (greater than about 3 wt. % solids content in acetone/water), but polymer-polymer phase separation was visible in the film morphology.

The invention is illustrated by the following non-limiting examples.

Example 1—Sulfonation of PEEK

Seven samples of sulfonated PEEK with different degrees of sulfonation where prepared by sulfonating PEEK from Victrex® (MW 34,000). Sulfonation was performed according to the procedure described in N. Shibuya and R. S. Porter, "Kinetics of PEEK sulfonation in concentrated sulfuric acid," Macromolecules, vol. 25, no. 24, pp. 6495-6499, November 1992 by dissolving 30 g of PEEK in 500 mL of sulfuric acid (95-98 wt. %, Sigma Aldrich). Seven such solutions were vigorously stirred at room temperature for 96, 120, 144, 172, 192, 264, and 336 h, respectively. After completion of the reaction time, the mixture was precipitated in water and washed until pH>5. The sulfonated polymer was dried in a 50° C. oven for at least 24 h. The corresponding ion exchange capacity (IEC) and degree of sulfonation (DS) were determined by titration as described in M. H. D. Othman, A. F. Ismail, and A. Mustafa, Malaysian Polymer Journal, 2007, 2, 10-28. The results are shown in Table 1.

TABLE 1

| Sulfonation reaction time (h) | Ion exchange capacity (meq/g) | Degree of sulfonation (%) | Estimated MW |
|---|---|---|---|
| 96 | 0.73 | 22.7 | 36,107 |
| 120 | 0.77 | 24.2 | 36,243 |
| 144 | 1.00 | 32.3 | 36,978 |
| 172 | 1.48 | 50.2 | 38,602 |
| 192 | 1.81 | 63.9 | 39,845 |
| 216 | 2.26 | 84.8 | 41,741 |
| 336 | 2.38 | 90.4 | 42,249 |

The DS ranged from about 23% to about 90% depending on the reaction time. For formulating and coating considerations, as well as swelling and performance considerations, a DS in the range from about 60% to about 70% was generally found to be preferred for the WVT applications described herein.

Example 2—Preparation and Testing of Membranes with a Si-PE Substrate Coated with Various Blends of sPEEK and CA A silica polyethylene (Si-PE) composite material (silica-loaded polyethylene substrate SP400 from PPG) was used as a microporous substrate, and eleven supported membrane samples were prepared by coating the substrate with sPEEK (DS 63%) or CA (39.7% acetyl content, average $M_N$ ca. 50,000) or blends thereof. The properties of the resulting membranes were tested to determine the effect of increasing the proportion of CA in the blended polymer. Sample 2A was coated with sPEEK only, and was prepared by applying a thin coating of an sPEEK solution (1 g of sPEEK in acetone/water, 10% solids) to one surface of the Si-PE substrate using a Mayer rod coater (the coating process used in all the Examples is described in further detail herein). Sample 2K was coated with CA only, and was prepared by applying a thin coating of a CA solution (1 g of CA in acetone/water, 10% solids) to one surface of the Si-PE substrate using a Mayer rod coater. In Samples 2B-2J, the substrate was coated with a blend of sPEEK and CA; the percentage by weight of CA in the polymer blend was increased in 10% increments through Samples 2B-2J. The membrane preparation method was essentially the same for all Samples 2A-2K, and the % solids in the acetone/water solution was 10% in each case. For example, for Sample 2F, 0.5 g of CA and 0.5 g of sPEEK (DS 63%) in acetone/water (10% solids, 5% CA, 5% sPEEK) was mixed together at room temperature until a clear solution was obtained. A thin coating of the CA/sPEEK solution was applied to one surface of Si-PE substrate using a Mayer rod coater. For each membrane sample the coating loading was determined, and the membrane was tested for air crossover, exhaust air transport ratio (EATR), water permeation (WVTR), and acetic acid permeation (AA crossover), using techniques described herein. The results are shown in Table 2.

TABLE 2

(Si-PE substrate)

| Membrane Sample # | sPEEK/CA ratio by weight * | Coating loading g/m² | EATR 2000 cc (%) | EATR 500 cc (%) | WVTR kg/m²/day (50° C.)** | AA crossover (%) at RH 0% | AA crossover (%) at RH 90% |
|---|---|---|---|---|---|---|---|
| 2A | 100/0 | 2.56 | 0 | 0 | 25.3 | 0.2 | 12.3 |
| 2B | 90/10 | 2.82 | 0 | 0 | 24.6 | 0.3 | 9.8 |
| 2C | 80/20 | 2.89 | 0 | 0 | 26.4 | 0.2 | 10.1 |
| 2D | 70/30 | 3.21 | 0 | 0 | 26.6 | 0.1 | 9.7 |
| 2E | 60/40 | 2.98 | 0 | 0 | 23.6 | 0.1 | 9.4 |
| 2F | 50/50 | 2.85 | 0 | 0 | 25.7 | 0.1 | 10.5 |
| 2G | 40/60 | 3.17 | 0 | 0 | 25.9 | 0.3 | 9.8 |
| 2H | 30/70 | 3.38 | 0 | 0 | 22.9 | 0.2 | 10.1 |
| 2I | 20/80 | 2.91 | 0 | 0 | 21.7 | 0.1 | 9.7 |
| 2J | 10/90 | 3.39 | 0 | 0 | 19.6 | 0.1 | 9.4 |
| 2K | 0/100 | 2.57 | 0.5 | 1.4 | 22.4 | 0.4 | n/a |

\* from acetone/water (8/2) solution, 10% solids
\*\*dynamic WVT test, 33 cm² area, 6,000 cm³/min flow, 50% RH in feed
n/a indicates not measured The air crossover was zero for all Samples 2A-K indicating that the coating formed a continuous layer or dense film on the substrate. The EATR was zero for all membrane samples, except Sample 2K which was coated with CA alone and had defects in it. Even though the WVTR of the membrane with 100% CA coating was lower than the membrane with 100% sPEEK coating at a similar loading (22.4 versus 25.3 kg/m²/day), it can be seen that adding CA to the coating did not adversely affect the WVTR even up to about 60% by weight CA in the blend. As shown in Table 2, AA crossover was low for all of the coated membrane samples at dry conditions (RH 0%). However, the AA crossover was significantly increased at high humidity conditions (RH 90%). Without being bound by any theory, this is believed to be due to plasticization of the membrane coating polymer by water vapor. These Si-PE based membrane samples did not pass the UL-94HB (horizontal burn) flame test described herein.

Example 3—Preparation and Testing of Membranes with a WP-PE Substrate Coated with Various Blends of sPEEK and CA This example is similar to Example 2 except that WP-PE was used as the substrate. Eleven supported membrane samples were prepared by coating the WP-PE substrate with sPEEK (DS 63%) or CA (39.7% acetyl content, average $M_N$ ca. 50,000) or blends thereof, and properties of the resulting membranes were tested to determine the effect of increasing the proportion of CA in the blended polymer. Sample 3A was coated with sPEEK only, and was prepared by applying a thin coating of an sPEEK solution (1 g of sPEEK in acetone/water, 10% solids) to one surface of the substrate using a Mayer rod coater. Sample 3K was coated with CA only, and was prepared by applying a thin coating of a CA solution (1 g of CA in acetone/water, 10% solids) to one surface of the substrate using a Mayer rod coater. In Samples 3B-3J the substrate was coated with a blend of sPEEK and CA; the percentage by weight of CA in the polymer blend was increased in 10% increments through Samples 2B-2J. The membrane preparation method was essentially the same for all Samples 2A-2K, and the % solids in the acetone/water solution was 10% in each case. For example, for Sample 3F, 0.5 g of CA and 0.5 g of sPEEK (DS 63%) in acetone/water (10% solids, 5% CA, 5% sPEEK) was mixed together at room temperature until a clear solution was obtained. A thin coating of the CA/sPEEK solution was applied to one surface of the WP-PE substrate using a Mayer rod coater. For each membrane sample the coating loading was determined, and the membrane was tested for air crossover, exhaust air transport ratio (EATR), water permeation (WVTR), and acetic acid permeation (AA crossover), using techniques described herein. The results are shown in Table 3.

TABLE 3

(WP-PE substrate)

| Membrane Sample # | sPEEK/CA ratio by weight * | Coating loading g/m² | EATR 2000 cc (%) | EATR 500 cc (%) | WVTR kg/m²/day (50° C.)** | AA crossover (%) at RH 0% | AA crossover (%) at RH 90% |
|---|---|---|---|---|---|---|---|
| 3A | 100/0 | 1.59 | 0 | 0 | 30.2 | 0.2 | 11.1 |
| 3B | 90/10 | 1.81 | 0 | 0 | 29.7 | 0.3 | 10.5 |
| 3C | 80/20 | 1.89 | 0 | 0 | 31.5 | 0.2 | 11.8 |
| 3D | 70/30 | 1.81 | 0 | 0 | 28.8 | 0.1 | 10.2 |
| 3E | 60/40 | 1.74 | 0 | 0 | 30.6 | 0.1 | 12.1 |
| 3F | 50/50 | 1.77 | 0 | 0 | 31.4 | 0.1 | 11.3 |
| 3G | 40/60 | 2.03 | 0 | 0 | 26.7 | 0.1 | 6.1 |

TABLE 3-continued (WP-PE substrate)

| Membrane Sample # | sPEEK/CA ratio by weight * | Coating loading g/m² | EATR 2000 cc (%) | EATR 500 cc (%) | WVTR kg/m²/day (50° C.)** | AA cross-over (%) at RH 0% | AA cross-over (%) at RH 90% |
|---|---|---|---|---|---|---|---|
| 3H | 30/70 | 2.04 | 0 | 0 | 26.2 | 0.1 | 6.6 |
| 3I | 20/80 | 1.95 | 0 | 0 | 25.0 | 0.1 | 6.3 |
| 3J | 10/90 | 1.80 | 0 | 0 | 24.0 | 0.1 | 6.3 |
| 3K | 0/100 | 2.68 | 0 | 0 | 16.5 | 0.1 | n/a |

\* from acetone/water solution, 10% solids
\*\*dynamic WVT test, 33 cm² area, 6,000 cm³/min flow, 50% RH in fee
n/a indicates not measured The air crossover and EATR was zero for all Samples 2A-K indicating that the coating formed a continuous layer or dense film on the substrate. Even though the WVTR of the membrane with 100% CA coating was lower than the membrane with 100% sPEEK coating (16.5 versus 30.2 kg/m²/day), it can be seen that adding CA to the coating did not adversely affect the WVTR even up to about 60% by weight CA in the blend. In fact, surprisingly it appears that the WVTR was higher for some of the blends than for sPEEK alone, even when the coating loading was higher (e.g. Samples 3C, 3E and 3F). The crossover of acetic acid (AA) was significantly increased at high humidity conditions (RH 90%), again likely due to plasticization of the membrane coating polymer by water vapor. However, this effect was lower for some of the membranes with blended coatings (3G-J). This effect of improved high humidity selectivity is even more prominent for a DP-PP substrate having a thin membrane coating polymer (see Example 10 herein). These WP-PP based membrane samples also passed UL-94HB (horizontal burn) flame test described herein.

Example 4—Preparation and Testing of Membranes with a WP-PE Substrate Coated with Various Blends of sPEEK and CA at Various Solids Contents In this example, the percentage solids in the coating solution was varied. Four supported membrane samples were prepared as in Example 3 by coating a WP-PE substrate with a 50/50 by weight blend of sPEEK (DS 63%) and CA (39.7% acetyl content, average $M_N$ ca. 50,000) in acetone/water solution. For Sample 4A the solution was 8% solids (0.4 g sPEEK, 0.4 g CA), for Sample 4B the solution was 7% solids (0.35 g sPEEK, 0.35 g CA), for Sample 4C the solution was 6% solids (0.3 g sPEEK, 0.3 g CA), and for Sample 4D the solution was 5% solids (0.25 g sPEEK, 0.25 g CA). The properties of the resulting membranes were tested to determine the effect of changing the solids content in the coating solution. For each membrane sample the coating loading was determined, and the membrane was tested for air crossover, exhaust air transport ratio (EATR), water permeation (WVTR), and acetic acid permeation (AA crossover), using techniques described herein. The results are shown in Table 4, and are compared with the results of Example 3 Sample 3F where the solids content was 10%.

TABLE 4

(WP-PE substrate)

| Membrane Sample # | sPEEK/CA % solids * | Coating loading g/m² | EATR 2000 cc (%) | EATR 500 cc (%) | WVTR kg/m²/day (50° C.)** | AA cross-over (%) at RH 0% | AA cross-over (%) at RH 90% |
|---|---|---|---|---|---|---|---|
| 3F | 10% | 1.77 | 0 | 0 | 31.4 | 0.1 | 11.3 |
| 4A | 8% | 1.59 | 0 | 0 | 32.0 | n/a | n/a |
| 4B | 7% | 1.28 | 0 | 0 | 31.6 | n/a | n/a |
| 4C | 6% | 1.24 | 0 | 0 | 32.4 | n/a | 10.2 |
| 4D | 5% | 1.10 | 0 | 0 | 34.9 | 0.1 | 8.39 |

\* 50/50 by weight of sPEEK/CA in acetone/water solution
\*\*dynamic WVT test, 33 cm² area, 6,000 cm³/min flow, 50% RH in feed
n/a indicates not measured The air crossover was zero for each of the Samples 4A-D. As the percentage solids content was reduced, the coating loading tended to decrease, causing an increase in WVTR. However, it appears that decreasing the coating weight (and thickness) does not cause any increase in the crossover of acetic acid.

Example 5—Preparation and Testing of Membranes with a WP-PE Substrate Coated with Various Blends of sPEEK and CAP This example is similar to Example 3 except that cellulose acetate propionate (CAP) (average $M_N$ ca. 25,000 by GPC, ca. 2.5% acetyl content, ca. 2.6 wt. % hydroxyl, ca. 45 wt. % propionyl from Sigma Aldrich was used in the polymer coating blends instead of CA. Four supported membrane samples were prepared by coating the WP-PE substrate with CAP or blends of CAP with sPEEK (DS 63%), and properties of the resulting membranes were tested to determine the effect of increasing the proportion of CAP in the blended polymer. Sample 5A was prepared by attempting to apply a thin coating of an sPEEK/CAP solution (0.5 g of sPEEK and 0.5 g CAP in 9/1 acetone/water, 10% solids) to one surface of the substrate using a Mayer rod coater; however the blend separated as two phases and could not be used as a coating with this solvent system. Sample 5B was prepared by similarly applying a thin coating of an sPEEK/CAP solution (0.3 g of sPEEK and 0.7 g CAP in acetone/water, 10% solids). Sample 5C was prepared by similarly applying a thin coating of an sPEEK/CAP solution (0.2 g of sPEEK and 0.8 g CAP in acetone/water, 10% solids). Sample 5D was prepared by similarly applying a thin coating of a CAP solution (1 g of CAP in acetone/water, 10% solids). For each membrane sample the coating loading was determined, and the membrane was tested for air crossover, exhaust air transport ratio (EATR), water permeation (WVTR), using techniques described herein. Acetic acid permeation (AA crossover) was not tested as the membranes all had defects. The results are shown in Table 5, and are compared with the results of Example 3 Sample 3A where the coating was 100% sPEEK.

TABLE 5

(WP-PE substrate)

| Membrane Sample # | sPEEK/ CAP ratio by weight * | Coating loading g/m$^2$ | Air crossover (cm$^3$/min) | EATR 2000 cc (%) | EATR 500 cc (%) | WVTR kg/m$^2$/day (50° C.)** |
|---|---|---|---|---|---|---|
| 3A | 100/0 | 1.59 | 0 | 0 | 0 | 30.2 |
| 5A | 50/50 | n/a | n/a | n/a | n/a | n/a |
| 5B | 30/70 | 1.95 | 4 | 1 | 4.8 | 19.0 |
| 5C | 20/80 | 2.32 | 2 | 0.5 | 3.8 | 17.3 |
| 5D | 0/100 | 1.65 | 0 | 0 | 0.5 | 16.3 |

* in acetone/water solution
**dynamic WVT test, 33 cm$^2$ area, 6,000 cm$^3$/min flow, 50% RH in feed
n/a: for Sample 5A the blend separated as two phases and could not be used as a coating with this solvent system.

There was difficulty creating blend solutions and blend membranes with the CAP/sPEEK polymers. The membranes that had sufficiently low defects to test, had much lower WVTR than sPEEK coatings alone, showing that blends of sPEEK and CAP did not perform as well as blends of sPEEK and CA. This indicates that adding CAP adversely affected the membrane properties, unlike adding CA.

Example 6—Preparation and Testing of Membranes with a WP-PE Substrate Coated with Various Blends of sPEEK and CAB This example is similar to Examples 3 and 5 except that cellulose acetate butyrate (CAB) was used in the polymer coating blends instead of CA or CAP. Six supported membrane samples were prepared by coating the WP-PE substrate with CAB (average $M_N$ ca. 70,000 by GPC, 12-15% acetyl content, 1.2-2.2 wt. % hydroxyl, 35-39 wt. % propionyl, from Sigma Aldrich) or blends of CAB with sPEEK (DS 63%), and properties of the resulting membranes were tested to determine the effect of increasing the proportion of CAB in the blended polymer. Sample 6A was prepared by attempting to apply a thin coating of an sPEEK/CAB solution (0.9 g of sPEEK and 0.1 g CAB in 9/1 acetone/water, 10% solids) to one surface of the substrate using a Mayer rod coater. Sample 6B was prepared by attempting to apply a thin coating of an sPEEK/CAB solution (0.7 g of sPEEK and 0.3 g CAP in acetone/water, 10% solids). Sample 6C was prepared by attempting to apply a thin coating of an sPEEK/CAB solution (0.5 g of sPEEK and 0.5 g CAB in acetone/water, 10% solids). In all three cases (Samples 6A, 6B and 6C) the blend separated as two phases and could not be used as a coating with this solvent system. Sample 6D was prepared by applying a thin coating of an sPEEK/CAB solution (0.3 g of sPEEK and 0.7 g CAB in acetone/water, 10% solids). Sample 6E was prepared by applying a thin coating of an sPEEK/CAB solution (0.2 g of sPEEK and 0.8 g CAB in acetone/water, 10% solids). Sample 6F was prepared by applying a thin coating of a CAB solution (1 g of CAB in acetone/water, 10% solids). For each membrane sample the coating loading was determined, and the membrane was tested for air crossover, exhaust air transport ratio (EATR), water permeation (WVTR), using techniques described herein. Acetic acid permeation (AA crossover) was not tested as the membranes all had defects. The results are shown in Table 6, and are compared with the results of Example 3 Sample 3A where the coating was 100% sPEEK.

TABLE 6

(WP-PE substrate)

| Membrane Sample # | sPEEK/ CAB ratio by weight * | Coating loading g/m$^2$ | Air crossover (cc/min) | EATR 2000 cc (%) | EATR 500 cc (%) | WVTR kg/m$^2$/day (50° C.)** |
|---|---|---|---|---|---|---|
| 3A | 100/0 | 1.59 | 0 | 0 | 0 | 30.2 |
| 6A | 90/10 | n/a | n/a | n/a | n/a | n/a |
| 6B | 70/30 | n/a | n/a | n/a | n/a | n/a |
| 6C | 50/50 | n/a | n/a | n/a | n/a | n/a |
| 6D | 30/70 | 2.05 | 11 | 2.9 | 8.7 | 12.3 |
| 6E | 20/80 | 2.21 | 8 | 2.4 | 7.7 | 14.1 |
| 6F | 0/100 | 1.51 | 0 | 0 | 0 | 10.6 |

* in acetone/water solution
**dynamic WVT test, 33 cm$^2$ area, 6,000 cm$^3$/min flow, 50% RH in feed
n/a: the blends separated as two phases and could not be used as coatings with this solvent system.

Similar to the blends of sPEEK and CAP, the WVTR performance was significantly adversely affected by the presence of the CAB polymer in the coating. The CAB also had compatibility problems in that it was immiscible with the sPEEK polymer in acetone/water formulations.

Example 7—Preparation and Testing of Membranes with a WP-PE Substrate Coated with a Blend of sPEEK and EC This example is similar to Examples 3, 5, and 6 except that ethyl cellulose (EC) was used in the polymer coating blends instead of CA, CAP, or CAB. Four supported membrane samples were prepared by coating the WP-PE substrate with EC (48.0-49.5% (w/w) ethoxyl basis, from Sigma Aldrich) at three different solids contents for the coating solution, and for a 50/50 blend of EC with sPEEK (DS 85%), and properties of the resulting membranes were tested to determine the effect of adding EC to the sPEEK as a blended polymer. Since EC is insoluble in acetone/water, sPEEK with DS 85% was used for solubility purposes in ethanol/water. Sample 7A was prepared by applying a thin coating of an sPEEK/EC solution (0.5 g of sPEEK and 0.5 g EC in 9/1 ethanol/water, 10% solids) to one surface of the substrate using a Mayer rod coater. Samples 7B-D were prepared by similarly applying a thin coating of an EC solution in ethanol at 10%, 7%, and 5% solids contents respectively. For each membrane sample the coating loading was determined, and the membrane was tested for air crossover, exhaust air transport ratio (EATR), water permeation (WVTR), using techniques described herein. The results are shown in Table 7, and are compared with the results of Example 3 Sample 3A where the coating was 100% sPEEK (DS 63%).

TABLE 7

(WP-PE substrate)

| Membrane Sample # | sPEEK/EC ratio by weight | % solids | Coating loading g/m² | Air cross-over (cc/min) | EATR 2000 cc (%) | EATR 500 cc (%) | WVTR kg/m²/day (50° C.)**** |
|---|---|---|---|---|---|---|---|
| 3A | 100/0* | 10% | 1.59 | 0 | 0 | 0 | 30.2 |
| 7A | 50/50** | 10% | 1.52 | 0 | 0 | 0 | 20.3 |
| 7B | 0/100*** | 10% | 2.11 | 0 | 0 | 0 | 18.2 |
| 7C | 0/100*** | 7% | 1.96 | 0 | 0 | 0 | 25.6 |
| 7D | 0/100*** | 5% | 0.72 | 0 | 0.5 | 1 | 27.3 |

*in 80/20 (wt.:wt.) acetone/water solution
**in 90/10 (wt.:wt.) ethanol/water solution
***in pure ethanol solution
****dynamic WVT test, 33 cm² area, 6,000 cm³/min flow, 50% RH in feed The water transport properties of the membranes comprising a blend of sPEEK and EC were not improved when compared with membranes comprising sPEEK or EC coatings. Reducing the solids content of the EC solution resulted in reduced coating loadings and a corresponding increase in water transport. Sample 7D had defects, hence the EATR results.

Example 8—Preparation and Testing of Membranes with a WP-PE Substrate Coated with Various Blends of Nafion® and EC This example is similar to Example 7 except that Nafion® (Dupont DE2021, a sulfonated tetrafluoroethylene-based fluoropolymer-copolymer) was used in the polymer coating blends instead of sPEEK. Four supported membrane samples were prepared by coating the WP-PE substrate with Nafion®, or blends of EC with Nafion®, and properties of the resulting membranes were tested to determine the effect of increasing the proportion of EC in the blended coating polymer. Sample 8A was prepared by applying a thin coating of a Nafion® solution (20% in propanol) to one surface of the substrate using a Mayer rod coater. Sample 8B was prepared by applying a thin coating of a Nafion®/EC solution (0.5 g of EC (48-49.6% ethyl basis) and 0.5 g Nafion® in ethanol, 10% solids). Sample 8C was prepared by applying a thin coating of a Nafion®/EC solution (0.8 g of EC (48-49.6% ethyl basis) and 0.2 g Nafion® in ethanol, 10% solids). Sample 8D was prepared by applying a thin coating of a Nafion®/EC solution (0.9 g of EC (48-49.6% ethyl basis) and 0.1 g Nafion® in ethanol, 10% solids). For each membrane sample the coating loading was determined, and the membrane was tested for air crossover, exhaust air transport ratio (EATR), water permeation (WVTR), using techniques described herein. The results are shown in Table 8, and are compared with the results for Example 7 Sample 7B where the coating was 100% EC.

TABLE 8

(WP-PE substrate)

| Membrane Sample # | Nafion®/EC ratio by weight | % solids | Coating loading g/m² | Air cross-over (cc/min) | EATR 2,000 cc (%) | EATR 500 cc (%) | WVTR kg/m²/day (50° C.)* |
|---|---|---|---|---|---|---|---|
| 7B | 0/100 | 10% | 1.52 | 0 | 0 | 0 | 18.2 |
| 8A | 100/0 | 20% | 2.52 | 0 | 0 | 0 | 43.4 |
| 8B | 50/50 | 10% | 1.79 | 0 | 0 | 0 | 15.4 |
| 8C | 20/80 | 10% | 1.82 | 0 | 0 | 0 | 16.4 |
| 8D | 10/90 | 10% | 1.80 | 0 | 0 | 0 | 19.6 |

*dynamic WVT test, 33 cm² area, 6,000 cm³/min flow, 50% RH in feed

The water transport properties of the membranes comprising a blend of Nafion® and EC were not significantly improved when compared with membranes comprising Nafion® or EC coatings. Nafion® has a high water vapor permeability; however, Nafion® is costly compared to sPEEK and demonstrates reduced selectivity at higher relative humidity conditions.

Example 9—Preparation and Testing of Membranes with a DP-PP Substrate Coated with Various Blends of sPEEK and CA This example is similar to Example 3 except that a dry stretch processed polypropylene substrate (DP-PP) was used. A significant performance increase was observed with this substrate compared to the other substrates tested. This was associated with a clearly observable layer of coating remaining on the membrane surface. In previous trials, a surface layer of coating could not be readily observed. While not being bound to any particular theory, it is postulated that the pore size and morphology of the substrate affect whether a coating film is deposited on the surface of the substrate, or whether it impregnates into the substrate pores.

In the WP-PE substrates used in Examples 3-8 the surface pore structure was less defined, had a wider pore size distribution, and the structure was more fibrous in nature, allowing the polymer in the coating solution to penetrate into the substrate to a greater extent during the coating process. With DP-PP substrates, the surface pore structure is clearly defined, there tends to be a smaller average pore size, the pore size distribution is narrower, and when coated with a polymer coating, a continuous surface film was created. This was clearly visible in cross-sectional images observed by electron microscope. A well-defined surface film was not visible in coated WP-PE substrates. The layer of coating on the surface of the DP-PP substrates could be observed visually as a 'shiny' or glossy film on the substrate surface as opposed to a more 'dull' or matte coating on surface of the WP-PE substrates.

The water permeation (WVTR) of the bare DP-PP substrate was tested (see Sample 9A in Table 9). Seven supported membrane samples were prepared by coating the DP-PP substrate with sPEEK (DS 63%) or CA (as in Example 3) or blends thereof, and properties of the resulting membranes were tested to determine the effect of increasing the proportion of CA in the blended polymer. Sample 9B was coated with sPEEK only, and was prepared by applying a thin coating of an sPEEK solution (10% sPEEK in acetone/water) to one surface of the substrate using a Mayer rod coater. Sample 9H was coated with CA only, and prepared by applying a thin coating of a CA solution (10% CA in acetone/water) to one surface of the substrate using a Mayer rod coater. In Samples 9C-9H the substrate was coated with a blend of sPEEK and CA; the percentage by weight of CA in the polymer blend was increased in 10% increments through Samples 9C-9H. The membrane preparation method was essentially the same for all Samples 9C-9H, and the % solids in the acetone/water solution was 10% in each case. For each membrane sample the coating loading was determined, and the membrane was tested for water permeation (WVTR) using techniques described herein.

TABLE 9

(DP-PP substrate)

| Membrane Sample # | sPEEK/CA ratio by weight * | Coating loading g/m$^2$ | Air crossover (cc/min) | EATR 2000 cc (%) | EATR 500 cc (%) | WVTR kg/m$^2$/day (50° C.)** |
|---|---|---|---|---|---|---|
| 9A | 0/0 | 0 | 0 | 0 | 0 | 43.4 |
| 9B | 100/0 | 1.94 | 0 | 0 | 0 | 39.84 |
| 9C | 90/10 | 2.08 | 0 | 0 | 0 | 39.24 |
| 9D | 80/20 | 2.08 | 0 | 0 | 0 | 40.08 |
| 9E | 70/30 | 2.13 | 0 | 0 | 0 | 37.96 |
| 9F | 60/40 | 2.07 | 0 | 0 | 0 | 37.31 |
| 9G | 50/50 | 2.43 | 0 | 0 | 0 | 35.18 |
| 9H | 0/100 | 2.38 | 0 | 0 | 0 | 26.96 |

* from acetone/water solution, 10% solids
**dynamic WVT test, 33 cm$^2$ area, 6,000 cm$^3$/min flow, 50% RH in feed Even at 50% CA/50% sPEEK, the performance of the blend membranes is significantly higher than would be expected from a direct 'rule of mixture" calculation. Without being bound to any particular theory, it is believed that blending CA with sPEEK leads to morphology changes in the coating layer, likely due to phase separation on drying, which may improve the permeability of the coating layer. Further, the CA blended in the sPEEK, seems to decrease the swelling of the sPEEK in the coating layer, without significantly decreasing the water vapor permeability of the coating. An added benefit was that these DP-PP substrate-based membrane samples also passed the UL-94HB (horizontal burn) flame test described herein.

Figure 10A:
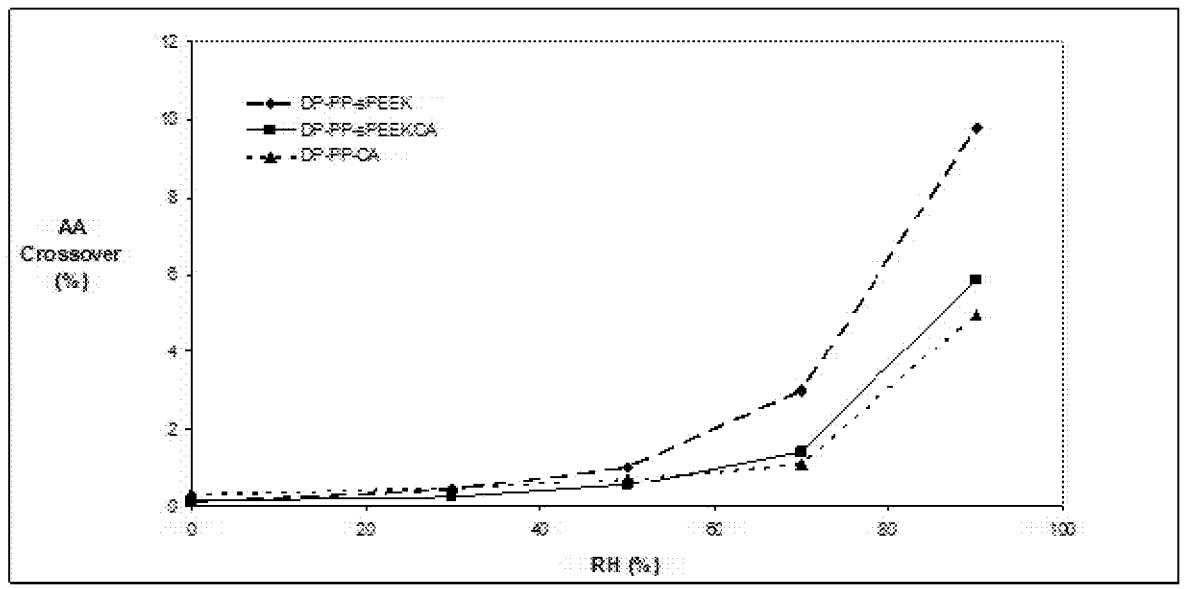
FIG. 10A is a curve showing the increase in acetic acid crossover of sample membranes as a function of relative humidity.
Figure 10B:
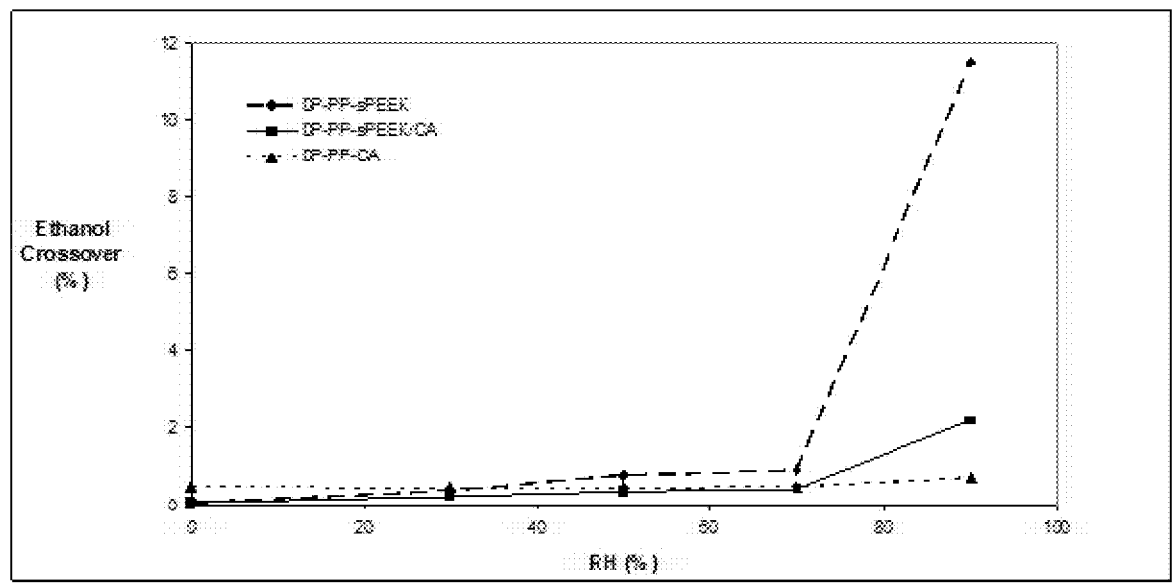
FIG. 10B is a curve showing the increase in ethanol crossover of sample membranes as a function of relative humidity.

Example 10—Contaminant Crossover Under Variable RH Conditions for a DP-PP Substrate Coated with Various Blends of sPEEK and CA An apparatus was developed to allow controlled humidity on both sides of the membrane samples, while allowing controlled generation of contaminants in the feed stream of the apparatus. Crossover of acetic acid and ethanol were determined for 3 different coated membrane samples at RH ranging from 0% to 90% at room temperature (23.3° C.) using DP-PP as a substrate. Sample DP-PP-sPEEK was coated with sPEEK (DS 63%), and was prepared by applying a thin coating of sPEEK solution (1 g of sPEEK in acetone/water, 10% solids) to one surface of the DP-PP substrate using a Mayer rod coater. Sample DP-PP-CA was coated with CA (39.7% acetyl content, average $M_N$ ca. 50,000), and was prepared by applying a thin coating of a CA solution (1 g of CA in acetone/water, 10% solids) to one surface of the DP-PP substrate using a Mayer rod coater. In Sample DP-PP-sPEEK-CA, the DP-PP substrate was coated with a blend of sPEEK and CA in a 1:1 ratio (0.5 g of CA and 0.5 g of sPEEK (DS 63%) in acetone/water (10% solids, 5% CA, 5% sPEEK) mixed together at room temperature until a clear solution was obtained). The coating process was completed using a Mayer rod coater. All three membrane samples had approximately the same polymer loading and thickness of coating. The results of the contaminant crossover tests are shown in Table 10, and are also plotted in the graphs shown in FIGS. 10A and 10B.

TABLE 10

(DP-PP substrate)

| RH (23.3° C.) RH (%)* | DP-PP-sPEEK Crossover (%) | | DP-PP-sPEEK-CA Crossover (%) | | DP-PP-CA Crossover (%) | |
|---|---|---|---|---|---|---|
| | Acetic Acid | Ethanol | Acetic Acid | Ethanol | Acetic Acid | Ethanol |
| 0 | 0.10 | 0.07 | 0.14 | 0.08 | 0.29 | 0.47 |
| 30 | 0.41 | 0.40 | 0.23 | 0.24 | 0.44 | 0.45 |
| 50 | 1.05 | 0.78 | 0.54 | 0.35 | 0.70 | 0.44 |
| 70 | 2.97 | 0.90 | 1.41 | 0.43 | 1.09 | 0.50 |
| 90 | 9.78 | 11.51 | 5.84 | 2.2 | 4.96 | 0.70 |

*ASTM F-739 module (5 cm$^2$ area), 600 cm$^3$/min flow, 100-400 ppm VOC

Increasing the RH in the contaminant stream generally increased the crossover of VOCs (specifically acetic acid and ethanol). Without being bound to any particular theory, this is believed to be due to plasticization of the membrane coating polymer by water vapor. As observed previously, for the membrane coated with sPEEK alone (Sample DP-PP-sPEEK), the contaminant crossover increased significantly at high RH (e.g. above 50% for AA and at 90% for ethanol). However, the membrane coated with a 1:1 blend of sPEEK:CA (Sample DP-PP-sPEEK-CA) showed significantly lower contaminant crossover at high RH than the DP-PP-sPEEK sample—closer to the results for the sample with just the CA coating (DP-PP-CA).

The WVT properties of each of the three Example 10 membrane samples were tested at 50% RH at two different temperatures, using the using techniques described herein. The results are reported in Table 11.

TABLE 11

(DP-PP substrate)

| Membrane Sample | WVTR [Permeance] (kg/m$^2$/day) [GPU] | |
|---|---|---|
| | 23.3° C., 47% RH* | 50° C., 50% RH** |
| DP-PP-sPEEK | 4.3 [8200] | 37.0 [11700] |
| DP-PP-sPEEK/CA | 4.1 [7700] | 35.8 [11000] |
| DP-PP-CA | 3.4 [6100] | 28.6 [8300] |

*ASTM F-739 module (5 cm$^2$ area), 600 cm$^3$/min flow
**dynamic WVT test, 33 cm$^2$ area, 6000 cm$^3$/min flow The sample coated with a 1:1 blend of sPEEK:CA (Sample DP-PP-sPEEK/CA) exhibited significantly higher WVTR than the sample with just a CA coating (DP-PP-CA) at both temperatures. The WVTR values for the sample with the blended coating (Sample DP-PP-sPEEK/CA) were closer to those for the sample with the sPEEK coating (DP-PP-sPEEK).

Data showing the water vapor permeance, and the selectivity for water vapor over acetic acid and ethanol transport, for each of the three Example 10 membrane samples at different relative humidities (RH) are reported in Tables 12 and 13. Selectivity is determined by dividing the permeance of water vapor at a given relative humidity and temperature by the permeance of AA or ethanol at the same relative humidity and temperature.

TABLE 12

(DP-PP substrate)

| RH (23.3° C.) | Water Vapor Permeance at 23.3° C. (GPU) | | |
|---|---|---|---|
| RH (%) | DP-PP-sPEEK | DP-PP-sPEEK-CA* | DP-PP-CA |
| 30 | 7488 | 6448 | n/a |
| 50 | 8056 | 7531 | 6050 |
| 70 | 8415 | 8056 | 6368 |
| 90 | 8828 | 8506 | 6898 |

*ASTM F-739 module (5 cm2 area), 600 cm3/min flow

TABLE 13

(DP-PP substrate)

| RH (23.3° C.) | DP-PP-sPEEK Selectivity | | DP-PP-sPEEK-CA Selectivity | | DP-PP-CA Selectivity | |
|---|---|---|---|---|---|---|
| RH (%)* | $H_2O$/AA | $H_2O$/Ethanol | $H_2O$/AA | $H_2O$/Ethanol | $H_2O$/AA | $H_2O$/Ethanol |
| 30 | 71 | 72 | 108 | 104 | 57 | 55 |
| 50 | 30 | 40 | 54 | 83 | 33 | 53 |
| 70 | 11 | 36 | 22 | 72 | 22 | 49 |
| 90 | 3 | 3 | 5 | 15 | 5 | 38 |

*ASTM F-739 module (5 cm2 area), 600 cm3/min flow

As shown in Table 12, the water vapor permeance generally increased with increasing RH for all three membrane samples. At all RH values tested, the water vapor permeance was significantly lower for the CA coating. The water vapor permeance values for the coating comprising a blend of sPEEK and CA were closer to the values obtained for the sPEEK-coated membrane. As shown in Table 13, the selectivity of all three membrane samples decreased with increasing RH. However, the coating comprising a blend of sPEEK and CA provided better selectivity at all RH conditions than the sPEEK coating, and better selectivity than the CA-coated membranes under most conditions.

Thus, CA can be incorporated into an sPEEK coating (e.g. sPEEK-CA 1:1) without having a major detrimental impact on WVT. Incorporating CA into an sPEEK coating lowers contaminant crossover and increases the selectivity of the membrane for water transport when compared to coatings comprising only sPEEK.

Example 11—Water Uptake Ratios and Water Vapor Sorption

Samples of sPEEK, CA, sPEEK/CA, and Na-sPEEK/CA films were placed in liquid water and then pat dry and weighed to determine the equilibrium liquid water update in these samples at room temperature.

TABLE 14

(Water Uptake)

| Samples | Water Uptake (%) |
|---|---|
| sPEEK | 230 |
| sPEEK/CA (1:1 wt.:wt.) | 170 |
| CA | 68 |
| Na-SPEEK/CA (1:1 wt.:wt.) | 225 |

The water uptake observed for the sample comprising a blend of sPEEK and CA is not directly proportion to the "rule of mixture", but rather has a slightly higher water uptake that is closer to that of the sPEEK sample. This indicates that the CA in the blend membrane does not prevent the sPEEK portion of the film from absorbing water to its full extent and in fact improves the overall uptake of the blend film. Compared with the non-neutralized blend of sPEEK/CA, a blend of neutralized Na-SPEEK and CA (when cast from acetone/water/ethanol) has a higher water uptake, which is of the same magnitude as the sPEEK sample.

Figure 11:
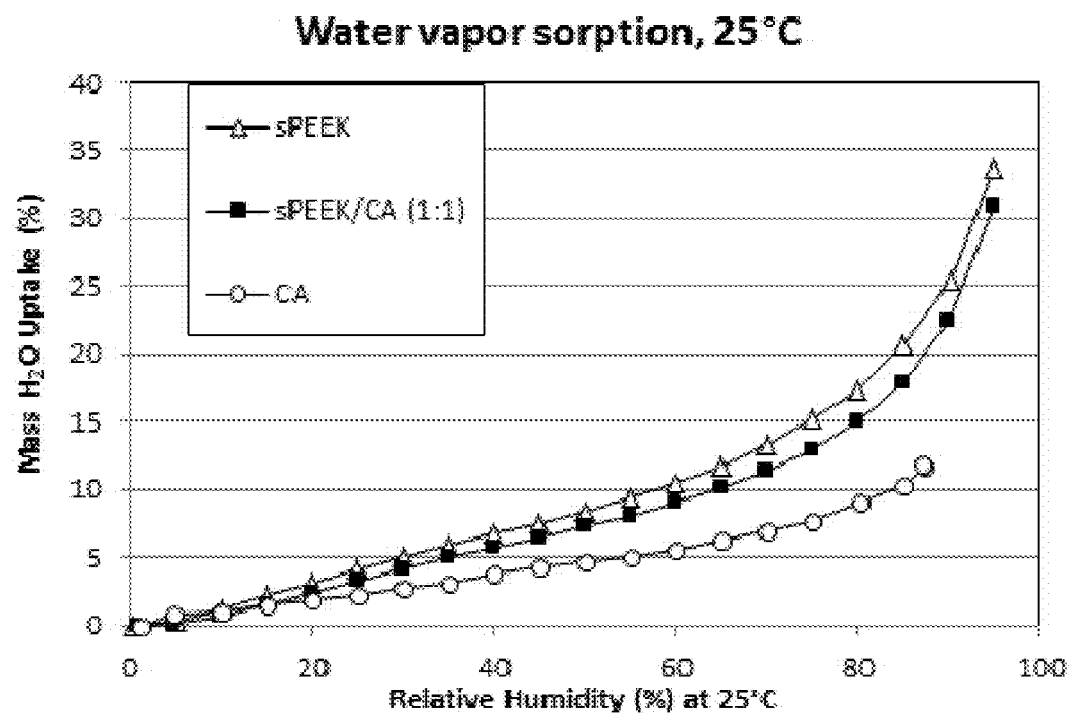
FIG. 11 is graph showing the relationship of water vapor sorption to relative humidity of sample membranes.
Figure 12:
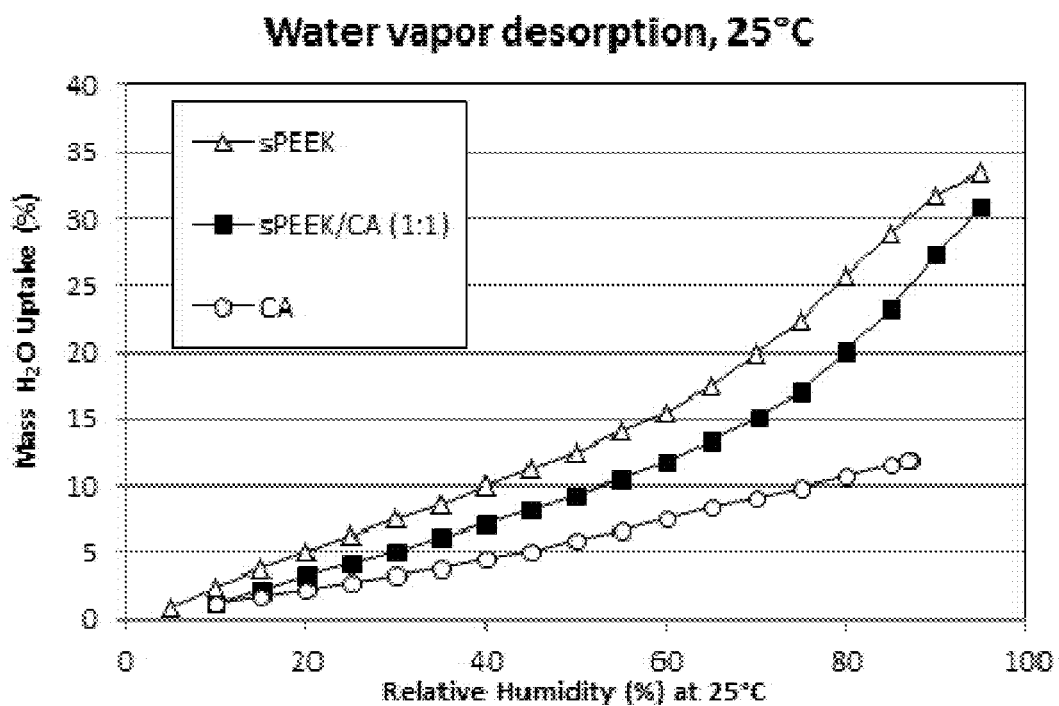
FIG. 12 is a graph showing the relationship of water vapor desorption to relative humidity of sample membranes.

The vapor sorption isotherms for the film materials shown in FIG. 11 indicate a similar effect indicating the film comprising a blend of sPEEK and CA (1:1 sPEEK:CA) has water vapor uptake that is similar to the sPEEK polymer film alone. Vapor sorption tests were completed using a gravimetric vapor sorption analyzer (Quantachrome) in which the sample is placed in an isothermal chamber, dried, and then exposed to air under controlled relative humidity. The sample is brought to equilibrium and the total moisture uptake at a given relative humidity and temperature is recorded. To create a sorption isotherm a series of measurements is taken an isothermal temperature over a range of RHs (i.e. 0% RH to about 100% RH). The desorption of water occurs more readily for the film comprising a blend of sPEEK and CA than the sPEEK film. The sPEEK film tends to hold more water on desorption than the sPEEK/CA film, which si closer in total desorption to the CA film (FIG. 12). Higher water vapor sorption and more desorption from the blend comprising sPEEK and CA is beneficial where water vapor must be absorbed and then desorbed in order for transport to occur through the membrane at given humidity conditions.

Example 12—Humidity Cycling

Membranes were fabricated by coating selective layers comprising sPEEK and a blend of sPEEK and CA (1:1) on a microporous dry-process substrate. The membranes were tested for leakage at the beginning of life (t=0). Samples were placed in an environment chamber where they were exposed to continuous humidity cycling at 50° C. (between 20 and 95% RH). Samples were tested every 100 cycles for leakage. Various other ERV membranes were placed in the environment chamber as well. All samples were in triplicate at a minimum; seven samples of the sPEEK and sPEEK/CA coated membranes were used. Table 15 shows maximum leak rates measured for each sample at 3 psi upstream pressure over a 45 cm² membrane area. Increased leak rate over the beginning of life leak rate indicates that damage occurred to the membrane during humidity cycling tests. Due to the semi-porous nature of the paper-based ERV membranes, they showed some leak at beginning of life.

TABLE 15

(RH Cycling of ERV membranes)

| Samples | Maximum measured pressurized air crossover (3 psi, 45 cm²) [cm³/min] | | | | |
|---|---|---|---|---|---|
|  | 0 cycles | 100 cycles | 200 cycles | 300 cycles | 400 cycles |
| sPEEK | 0 | 13 | 5 | 20 | 22 |
| sPEEK/CA | 0 | 0 | 0 | 0 | 0 |
| dPoint Mx4A | 0 | 0 | 0 | 0 | 0 |
| Paper1 | 1300 | 2700 | 30000 | — | — |
| Paper2 | 80 | 630 | 1280 | — | — |
| Composite1 | 0 | 8300 | — | — | — |
| Film1 | 0 | 10000 | — | — | — |

(—) indicates that the samples were removed from the chamber

It is evident from the RH cycling tests that many commercially available ERV materials cannot withstand RH cycling. However, in use in ERV applications, such materials will generally be continuously exposed to variable RH conditions over the lifetime of the material. The sPEEK/CA coated membranes withstood the RH cycling tests. The sPEEK coated membranes do show some leakage after RH cycling, indicating that sPEEK coated membranes are less robust to humidity cycling conditions than membranes coated with a blend of sPEEK and CA. However, the sPEEK leakage is orders of magnitude lower than many commercially available products. Without being bound to any particular theory, it is believed that the 'less swellable' CA reinforces the sPEEK and prevents excessive swelling and dimensional instability which would otherwise lead to defects and failure over time under RH cycling conditions.

Example 13—Neutralization of Blends of sPEEK and CA to the Sodium Form

Due to the degradation of CA in acidic solutions, and in the sPEEK/CA film layer, sPEEK was neutralized (i.e. the sulfonic acid group protons exchanged for cations). To prepare a neutralized/exchanged Na-sPEEK/CA (1:1) coating solution, 2.5 g of sPEEK and 2.5 g CA were dissolved in 80/20 acetone/water and the solution was made up to 90 g (5.6% solids content). A solution of 0.5 M $NaHCO_3$ or NaOH was added drop wise until the pH was between about 5 to about 6. The final polymer solids content was about 5%. When the coating solution contained 2.5 g of sPEEK, 0.42 g $NaHCO_3$ was added.

Alternatively, sPEEK may be treated with excess 0.1 M NaOH. sPEEK is soaked in 0.1 M NaOH solution and rinsed with deionized water until the pH of the wash solution is neutral (i.e. pH about 7). The resulting Na-sPEEK is washed with deionized water and dried at 50° C. 2.5 g of the resulting neutralized Na-sPEEK and 2.5 g CA are dissolved in 72.5:27.5 acetone/water solution and the solution is made up to 100 g (5% solids content).

Films cast from the neutralized/exchanged Na-sPEEK solutions showed no evidence of degradation of the CA. In membranes cast from these solutions, no leakage or long term degradation of performance was observed and WVT was substantially equivalent to sPEEK/CA membranes made from the proton form of the sPEEK.

Example 14—Na-sPEEK and CA Blends Cast from Ternary Solvent Solutions

To reduce or minimize phase inversion and improve Na-sPEEK/CA coating on a DP-PP substrate, a ternary solvent system may be used to formulate a Na-sPEEK/CA coating solution. The ternary solvent system may comprise acetone, water, and ethanol. Na-sPEEK/CA coating solutions were formulated using different acetone/water/ethanol ratios, wherein acetone/water was 72/28 (wt./wt.) in all samples, the sPEEK was about 63% DS, the CA was about 39.7% acetyl content, and the average $M_N$ ca. of CA was about 50,000. In each sample coating solution, the sPEEK:CA (wt.:wt.) ratio was about 1:1 and the polymer solids content was about 4%. sPEEK was neutralized/exchanged using 0.5 M $NaHCO_3$ to yield Na-sPEEK/CA as described elsewhere herein. Membranes were made by coating each sample solution on a DP-PP substrate. Coating weight was in the range of about 0.5 g/m² to about 1.5 g/m². Films of the coating formulated from coating solutions comprising 10 wt. % ethanol or less had some discontinuities or evidence of pores induced by phase inversion. With the exception of the membrane made using a coating solution with a 2% solids content, all membranes exhibited zero crossover leak and zero EATR indicating that defect-free selective layers were cast on the DP-PP surface.

TABLE 16

(Ternary solvent systems)

| Sample | Acetone (%) | H$_2$O (%) | Ethanol (%) | Na-sPEEK (%) | CA (%) |
|---|---|---|---|---|---|
| DP-Na-sPEEK-CA1 | 69 | 27 | 0 | 2.0 | 2.0 |
| DP-Na-sPEEK-CA2 | 68 | 26 | 2 | 2.0 | 2.0 |
| DP-Na-sPEEK-CA3 | 67 | 26 | 3 | 2.0 | 2.0 |
| DP-Na-sPEEK-CA4 | 66 | 25 | 5 | 2.0 | 2.0 |
| DP-Na-sPEEK-CA5 | 62 | 24 | 10 | 2.0 | 2.0 |
| DP-Na-sPEEK-CA6 | 58 | 22 | 16 | 2.0 | 2.0 |
| DP-Na-sPEEK-CA7 | 55 | 21 | 20 | 2.0 | 2.0 |
| DP-Na-sPEEK-CA8 | 55 | 22 | 20 | 1.5 | 1.5 |
| DP-Na-sPEEK-CA9 | 56 | 22 | 20 | 1.0 | 1.0 |

TABLE 17

(Membrane Performance)

| Sample | Film Quality | Cross-over (cm$^3$/min) | EATR (500, 2000) (%) | WVT (kg/m2/day) 25° C.*** | Permeance (GPU) 25° C.*** |
|---|---|---|---|---|---|
| DP-Na-sPEEK-CA1 | Discontinuous* | 0 | (0, 0) | 9.3 | 11700 |
| DP-Na-sPEEK-CA2 | Discontinuous* | 0 | (0, 0) | 9.3 | 11700 |
| DP-Na-sPEEK-CA3 | Discontinuous* | 0 | (0, 0) | 9.3 | 11700 |
| DP-Na-sPEEK-CA4 | Discontinuous* | 0 | (0, 0) | 9.4 | 11900 |
| DP-Na-sPEEK-CA5 | Discontinuous* | 0 | (0, 0) | 9.7 | 12500 |
| DP-Na-sPEEK-CA6 | Continuous** | 0 | (0, 0) | 9.5 | 12100 |
| DP-Na-sPEEK-CA7 | Continuous** | 0 | (0, 0) | 9.6 | 12300 |
| DP-Na-sPEEK-CA8 | Continuous** | 0 | (0, 0) | 9.7 | 12500 |
| DP-Na-sPEEK-CA9 | Continuous** | 75 | — | — | — |

*discontinuous films or films with evidence of clouding, porosity, or phase inversion
**clear and uniform films with no evidence of clouding
***Dynamic WVT test, 33 cm$^2$ area, 6000 cm$^3$/min flow, 50% RH in feed sPEEK polymers have desirable properties for WVT membranes. However, dense films of sPEEK tend to be expensive and often have poor dimensional stability under wet conditions. Supporting a thin layer of such polymers on a microporous substrate can impart desirable mechanical properties to the resulting membrane, as well as reducing the quantity of costly sPEEK polymer needed for a particular end-use application. Membranes comprising a microporous substrate coated with a thin layer of sPEEK polymer were found to have desirable properties for ERV applications, including: high WVT; low transport of other chemical species (VOCs and odors); low air crossover; and ability to cast the sPEEK polymer on higher performance substrates which are also flame resistant. However, at high humidity conditions, these polymers tend to swell, which can increase permeability of VOCs and other undesirable chemical species, reducing the selectivity of the membrane.

In seeking to further reduce the quantity of sPEEK used in the coated membranes, sPEEK was blended with a cellulose derivate (which is less expensive), and the blended membrane was used as a coating. Surprisingly it was discovered that membranes comprising some blended polymer coatings exhibited water vapor permeability properties comparable to, or even better than, membranes comprising a coating made of sPEEK alone (even though the water vapor permeability of the cellulose derivatives are generally substantially lower than those of sPEEK polymers). This was particularly true when sPEEK was blended with CA, as shown in the Examples and test results provided herein. Furthermore, including CA in the blend tended to decrease the swelling of the coating layer in the presence high RH in air stream interfacing with the membrane. This decrease in swelling resulted in significantly decreased permeance of VOCs through the membrane under high humidity conditions, without significantly compromising the water vapor permeance at all humidity conditions. The membranes with a blended polymer coating also demonstrated improved stability under relative humidity cycling conditions relative to the membranes coated with sPEEK. Further experiments showed that blending CA or other cellulose derivatives with other highly water permeable polymers besides sPEEK, does not necessarily give a polymer or membrane with desirable properties. It seems it is not possible to predict the properties of a blended polymer based on the properties of the individual components in the blend. The combination of sPEEK polymers with CA seems to be particularly and unexpectedly advantageous.

ERV Core

ERV cores may be of the type described in applicant's international application No PCT/CA2012/050918 entitled COUNTER-FLOW ENERGY RECOVERY VENTILATOR (ERV) CORE.

Figure 13:
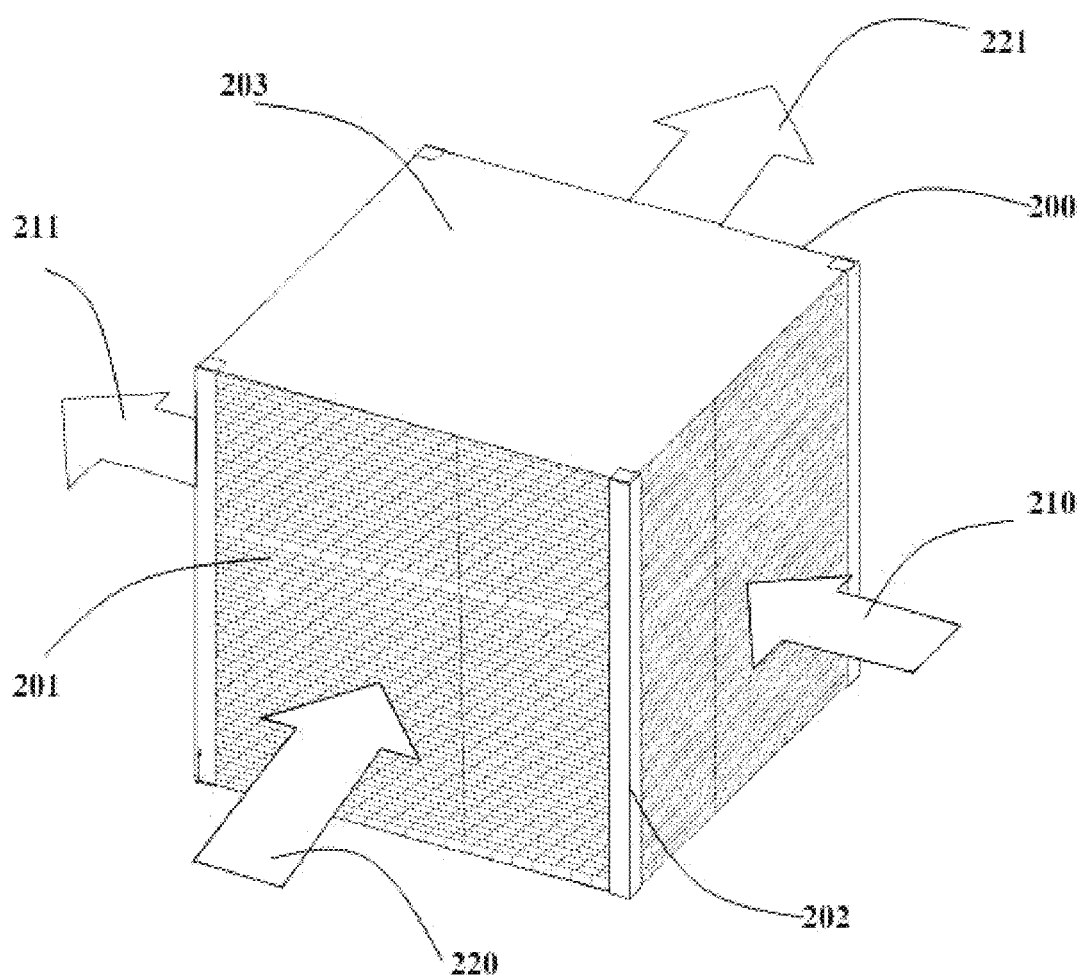
FIG. 13 is a schematic illustration showing an ERV core according to an example embodiment.

FIG. 13 shows a simplified isometric view of an embodiment of an ERV core comprising a pleated membrane cartridge 200 which comprises alternating layers of membrane 201 with gas flow pathways in between adjacent layers. The flow pathways can comprise channels that run through the core over the surface of the membrane and are sealed such that there is flow of gases through the core from one face to the other without mixing of the two streams through the membrane. The gas streams are directed through pleated membrane cartridge 200 of ERV core such that one side of each membrane layer is exposed to one gas stream 210 and the opposing side of the membrane layer is exposed to the other gas stream 220. In the illustrated embodiment the gases are in a cross-flow configuration. Counterflow, co-flow, and other relative flow configurations can be used depending on the geometry of the ERV core and the manifolding. Transport of heat and moisture occurs through the membrane due to the differential of heat of moisture between the two gas streams. The flow of heat and moisture may occur in either direction through the membranes, depending on the conditions of the gas streams 220 and 210. When stream 210 is cool and dry and stream 220 is warm and moist, heat and humidity transport will occur through the membrane to heat and humidify flow 210 before it exits the core at 211. The warm and moist flow 220 will thus be cooled and dehumidified as it passes through the core and exits at 221.

The perimeter of the pleated membrane cartridge 200 is sealed to prevent gases from leaking between the perimeter of the pleated cartridge and the interior of the ERV housing (not shown in FIG. 13). For example, gaskets or seals 202 and 203 can be disposed along the edges and top and bottom surfaces of pleated membrane cartridge 200 so that once in the ERV system a seal will be created between the inlet and outlet ports to prevent short-circuiting of the gases between the streams.

Figure 14:
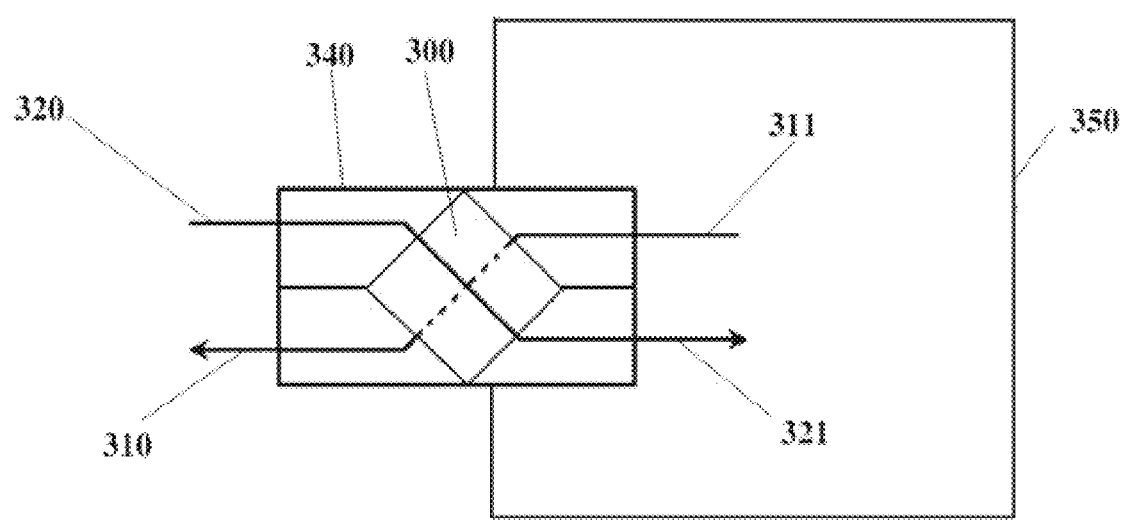
FIG. 14 is a schematic illustration showing an ERV core in an ERV system according to an example embodiment.

FIG. 14 shows a simplified view of an ERV core 300 in an ERV system 340. System 340 can contain fans and controls to move the air through the system in the directions indicated by the arrows in FIG. 14. Seals are created around the periphery of the core. The ERV system interfaces between air in an enclosed building space 350, and the exterior environment. The seals allow air streams to be directed through ERV core 300 in such a way that incoming air 320 entering building 350 passes on one side of the membrane layers in the core 300 and outgoing air 311 exiting building 350 passes on the other side of the membrane layers in the core. If outgoing air 311 is cool and dry and incoming air 320 is warm and moist, heat and moisture transport will occur through the membrane in the core such that outgoing/exhaust air 310 will have gained heat and moisture, and incoming air 321 entering building 350 will have been cooled and dehumidified.

Methods of Testing

To accurately and consistently coat membranes on a bench-scale, a Mayer rod coater was used. This type of coating device may also be referred to as Meyer bar, miter rod, Meyer rod, meter bar, coating rod, equalizer bar, doctor rod, or metering rod coater. In these types of bars, steel wire is wound tightly around a rod. The gap spacing created between adjacent wraps of the wire will depend on the diameter of the wire used to wrap the rod. In the coating apparatus used in the examples herein, the wire-wound rod is placed at a substantially constant downward pressure on top of the substrate, and then polymer solution is deposited by pipette onto the substrate surface in front of the rod. A linear actuator drives the rod across the substrate surface at a constant rate spreading the coating on the substrate. The thickness of the wet coating deposited on the substrate surface will depend on the diameter of the wire used to wrap the rod. Wire diameters used ranged from 0.05 mm to 0.3 mm allowing controlled wet film deposits ranging from about 4 micron to about 24 micron. The coating settles by gravity into a film of substantially uniform wet thickness, after which the material is dried to remove the solvent and create a coated substrate with a consistent dry coating thickness and coating loading. Further refinement in the coating loading can be achieved by altering the solids content, viscosity, density, and surface tension properties of the solution used. In roll-to-roll processes a slot die or reverse gravure coating method is preferred.

To assess the air permeation or air crossover properties of the membrane materials in the examples herein, membrane samples were sealed in a test apparatus. Pressurized air was applied to one side of the membrane and the air flow through the material was recorded. In a typical test, the pressurized air was applied at 3 psi or 20.7 kPa. The crossover flow rate through the test sample was recorded in cubic centimeters per minute ($cm^3/min$). This value can be converted to an air permeation value by dividing by the applied pressure and the membrane area (45 $cm^2$ in a typical test). Air permeation can be reported in $cm^3/min/cm^2/kPa$. Unless otherwise reported, the membrane samples had an air crossover of zero, indicating there were substantially no defects in the coating layer of the membrane.

The exhaust air transfer ratio (EATR) provides an indication of the amount of contaminant gas that may pass through the membrane material. It would be desirable for this value to be less than 5%, and more desirable for it to be less than 1%. Optimally there is 0% contaminant gas transport through the material. A test was developed to determine the EATR of the membrane. In this test, again a membrane sample was placed in a test apparatus which separates the two sides of the membrane, so that independent gas streams may be provided on opposing sides of the membrane. The module had an area of 33 $cm^2$ in which gas flow was directed over opposing sides of the membrane in a counter-flow orientation, the gases flowing through 7 channels each about 16 cm in length, 1 mm in depth, and 3 mm in width. On one side of the membrane a pure nitrogen stream was passed over the surface of the membrane. On the other side of the membrane an air stream was passed over the membrane surface. The flow rate of the gases over each side of the membrane was equal in any given test, however transport was measured at two flow rates for each sample, 2000 $cm^3/min$ (about 1.6 m/s) and 500 $cm^3/min$ (about 0.4 m/s). At lower flow, the residence time of gases flowing over the membrane surfaces in the module is longer, and higher transport rates can be measured. The transport of oxygen and nitrogen in this test is a measure of defects in the coating layer. Membranes having a coating with substantially no defects should have zero EATR at both 2000 $cm^3/min$ and 500 $cm^3/min$ flow rates. The differential pressure between the two streams was maintained at zero so that only diffusive transport and not convective transport occurs through the membrane. An oxygen sensor was placed at the outlet of the nitrogen stream to measure the oxygen concentration. Since the concentration of oxygen in air is known, and the nitrogen stream contained no oxygen at the inlet, the percentage of oxygen passing through the membrane by diffusion can be reported as:

$$\text{EATR \%} = \{[C(O_2,1)]/[C(O_2,2)]\} \times 100$$

where C refers to the percent concentration of oxygen ($O_2$) at points 1 and 2, with point 1 being at the nitrogen-side outlet (measured by the sensor), and point 2 being at the air-side inlet (measured at 20.9%).

A dynamic water vapor transport rate (WVTR) testing procedure was developed which was designed to test the membranes under conditions which are similar to those in which they might be utilized. This test apparatus is similar to that described as a dynamic moisture permeation test by P. Gibon, C. Kendrick, D. Rivin, L. Sicuranza, and M. Charmchi, "An Automated Water Vapor Diffusion Test Method for Fabrics, Laminates, and Films," Journal of Industrial Textiles, vol. 24, no. 4, pp. 322-345, April 1995 and also summarized in ASTM E298 and specifically ASTM F2298. A membrane sample was sealed in a test apparatus with flow field pathways on both sides of the membrane to evenly distribute gases over the both surfaces of the sample, the gases being separated by the membrane. The flow rate, temperature, and RH of each inlet gas stream could be controlled, and the outlet temperatures and RH of each gas stream could be measured. The gases were supplied and directed in counter-flow over the opposing surfaces of the membrane. The membrane active area in the test jig was 33 $cm^2$. In a typical isothermal test, a first gas stream (sweep stream) was supplied at 50° C. and 0% RH to the inlet on one side on the membrane at 6000 $cm^3/min$ (about 0.8 m/s). A second gas stream (the feed stream) was supplied to the inlet on the other side of the membrane at 50° C. and 50% RH, and at the same flow rate as the first gas. The water content and temperature of the two streams were measured and recorded at the outlets. From these values, the water transport rate of the test sample was determined, in units of mass per time (g/h). The results may also be reported as a water flux by dividing by the membrane area over which the transport has occurred in units of mass per area per time ($kg/m^2/h$ or in units of $mol/m^2/s$). By dividing flux by the calculated mean vapor pressure differential across the membrane within the test module, a permeance value can be determined in units of mass per area per time per vapor partial pressure differential ($mol/m^2/s/Pa$) and is typically reported in gas permeance units (GPU) where 1 GPU=1× $10^{-6}$ $cm^3$ (STP) $cm^{-2}$ $s^{-1}$ $cmHg^{-1}$). Permeance is reported as an apparent permeance without accounting for concentration boundary layers associated with water vapor at the membrane surfaces. Due to the scale of the results it was found to be most convenient to report water transport data as a water flux value in units of $kg/m^2/day$. For tests where the temperature and RH were not at the standard test conditions (feed stream at 50° C. and 50% RH), the temperature and humidity are reported. In some tests the membranes water vapor transport was measured with the feed stream at 25° C. and 50% RH. In other tests the feed stream relative humidity was varied.

In order to measure the transport of 'contaminants' through ERV membranes, acetic acid (AA) and ethanol were used as example VOC contaminants for permeation testing. The permeation method used for measuring chemical transport in membrane was modified from ASTM F-739: Standard Test Method for Permeation of Liquids and Gases through Protective Clothing Materials under Conditions of Continuous Contact. Quantitative analysis was performed using a TD-GC system.

Results were reported as a percentage of the contaminant concentration measured in the collection stream over the contaminant concentration in the supply stream, according to the following equation:

$$\text{Transport} = \frac{Q_1 C_{x2}}{Q_3 C_{x3}} \times 100\%$$

where $Q_1$ is the flow rate in the sweep stream (L/min); $Q_3$ is the flow rate in the feed stream (L/min); $C_{x2}$ is the concentration of x contaminant in the sweep stream (µg/L); and $C_{x3}$ is the concentration of x contaminant in the feed stream (µg/L). The module used in this test was the standard module for the ASTM F-739 test (manufactured by Pesce Lab Sales). The module had an active area with a diameter of 1", 0.785 $in^2$ or 5 $cm^2$. In each experiment, gases were supplied at 600 $cm^3$/min on either side of the membrane. Concentrations of the acetic acid were typically in the range of 100 to 200 ppm in the feed stream, and concentrations of ethanol were typically in the range of 200 to 400 ppm in the feed stream.

The flame test used was based on the UL-94HB horizontal burn test standard from Underwriters Laboratories which is designed to determine the flammability of a material. A sample of membrane was cut to 1.25 cm×12.5 cm. The sample was supported horizontally and then tilted lengthwise at a 45° angle from horizontal. A propane flame approximately one centimeter in height was applied to the lower short edge of the titled membrane sample. The flame was held to the sample until the flame spread past 2.5 cm of the material. After 2.5 cm of the material burned, the flame was removed and the flame was allowed to propagate across the material. The burn time and burn distance were recorded and the burn rate was determined in cm/s. If the material self-extinguished before the 10 cm mark and the material has a burn rate of less than 0.125 cm/s then the material passes the HB test.

The present membranes are particularly suitable for use in enthalpy exchangers, but may also be suitable for other applications involving exchange of moisture and optionally heat between gas streams with little or no mixing of the gas streams through the membrane. Such potential applications include fuel cell humidifiers, gas drying, dehumidification, medical gas humidification, desalination and airplane humidification, water filtration, gas separation, and flue gas heat and water recovery.

The present membranes are preferably coated on just one surface with a thin layer of water permeable polymer to give an anisotropic membrane as described above. However, membranes with different properties and water transport characteristics can be obtained by applying the herein-described coatings to both sides of the substrate, to provide a thin surface layer of water permeable polymer formed on both sides of the substrate.

The present membranes are preferably coated with a blended polymer comprising sPEEK. sPEEK is of the polyaryletherketone family of polymers and although sPEEK is preferably used in the present membranes, person skilled in the art will recognize that various polyaryletherketones can be sulfonated and used in a similar manner.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a substrate, assembly, device, manifold, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments described herein.

Specific examples of systems, methods, and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

We claim:

1. A water vapor transport membrane comprising a microporous substrate and an air impermeable selective layer coated on a first surface of the substrate, wherein the selective layer has a thickness of less than about 5 microns and wherein the selective layer comprises at least one cellulose derivative and at least one sulfonated polyaryletherketone, wherein the at least one sulfonated polyaryletherketone comprises a sulfonated polyaryletherketone in a cation form.

2. A water vapor transport membrane according to claim 1, wherein about 80% to about 100% of the at least one sulfonated polyaryletherketone is in the cation form.

3. A water vapor transport membrane according to claim 1, wherein the at least one cellulose derivative has lower water vapor permeability and is less water swellable than the at least one sulfonated polyaryletherketone, and wherein a weight-to-weight ratio of the at least one cellulose derivative and the at least one sulfonated polyaryletherketone in the selective layer results in a level of phase separation in the selective layer that causes swelling of the at least one sulfonated polyaryletherketone, upon exposure of the water vapor transport membrane to moisture, to be constrained by the at least one cellulose acetate derivative.

4. A water vapor transport membrane according to claim 1, wherein the at least one cellulose derivative comprises a cellulose derivative selected from the group consisting of cellulose acetate (CA), cellulose acetate propionate (CAP), cellulose acetate butyrate (CAB), and ethyl cellulose (EC).

5. A water vapor transport membrane according to claim 4, wherein the at least one sulfonated polyaryletherketone comprises sulfonated polyether ether ketone (sPEEK).

6. A water vapor transport membrane according to claim 1, wherein the selective layer comprises the at least one sulfonated polyaryletherketone and the at least one cellulose derivative in a sulfonated polyaryletherketone/cellulose derivative (wt.:wt.) ratio in the range of about 7:3 to about 2:3.

7. A water vapor transport membrane according to claim 1 wherein an acetyl content of the at least one cellulose derivative is in the range of about 20% to about 62%, and a degree of sulfonation of the at least one sulfonated polyaryletherketone is in the range of about 23% to about 100%.

8. A water vapor transport membrane according to claim 1, wherein the at least one sulfonated polyaryletherketone is polyether ether ketone (sPEEK), the at least one cellulose derivative is cellulose acetate (CA), a sPEEK:CA (wt.:wt.) ratio is in the range of about 9:1 to about 1:9, the acetyl content of the CA is in the range of about 20% to about 62%, and the degree of sulfonation of the sPEEK is in the range of about 23% to about 100%.

9. A water vapor transport membrane according to claim 1, wherein the selective layer is sufficiently flexible to allow pleating of the membrane without fracturing the selective layer.

10. A method for making a water vapor transport membrane, the method comprising:
    applying a coating solution or dispersion to a first surface of a microporous substrate and allowing the coating solution or dispersion to dry to form an air impermeable selective layer on the substrate, the selective layer having a thickness of less than about 5 microns, wherein the coating solution or dispersion comprises at least one cellulose derivative and at least one sulfonated polyaryletherketone; and
    exchanging sulfonic acid group protons of the at least one sulfonated polyaryletherketone with cations.

11. A method according to claim 10, wherein about 80% to about 100% of the sulfonic acid group protons of the at least one sulfonated polyaryletherketone are exchanged for cations.

12. A method according to claim 10, wherein the at least one cellulose derivative has lower water vapor permeability and is less water swellable than the at least one sulfonated polyaryletherketone, and wherein a weight-to-weight ratio of the at least one cellulose derivative to the at least one sulfonated polyaryletherketone in the selective layer is selected such that there is a level of phase separation in the selective layer that causes swelling of the at least one sulfonated polyaryletherketone, upon exposure of the water vapor transport membrane to moisture, to be constrained by the at least one cellulose derivative.

13. A method according to claim 10, wherein the at least one cellulose derivative comprises a cellulose derivative selected from the group consisting of cellulose acetate (CA), cellulose acetate propionate (CAP), cellulose acetate butyrate (CAB), and ethyl cellulose (EC).

14. A method according to claim 13, wherein the at least one sulfonated polyaryletherketone comprises sulfonated polyether ether ketone (sPEEK).

15. A method according to claim 10, wherein the coating solution or dispersion comprises the at least one sulfonated polyaryletherketone and the at least one cellulose derivative in a sulfonated polyaryletherketone/cellulose derivative (wt.:wt.) ratio in the range of about 7:3 to about 2:3.

16. A method according to claim 10, wherein an acetyl content of the at least one cellulose derivative is in the range of about 20% to about 62%, and the degree of sulfonation of the at least one sulfonated polyaryletherketone is in the range of about 23% to about 100%.

17. A method according to claim 10, wherein the at least one sulfonated polyaryletherketone is sulfonated polyether ether ketone (sPEEK) and the at least one cellulose derivative is cellulose acetate (CA), wherein a sPEEK:CA (wt.: wt.) ratio in the coating solution or dispersion is in the range of about 9:1 to about 1:9, an acetyl content of the CA is in the range of about 20% to about 62%, and a degree of sulfonation of the sPEEK is in the range of about 23% to about 100%.

18. An energy recovery ventilation (ERV) core comprising a pleated membrane cartridge, the membrane cartridge comprising a plurality of layers of a water vapor transport membrane, the water vapor transport membrane comprising a microporous substrate and an air impermeable selective layer coated on a first surface of the substrate, wherein the selective layer has a thickness of less than about 5 microns and wherein the selective layer comprises at least one cellulose derivative and at least one sulfonated polyaryletherketone, the ERV core having gas flow pathways in between adjacent ones of the membrane layers.

* * * * *